US008789192B2

(12) United States Patent
LaBumbard

(10) Patent No.: US 8,789,192 B2
(45) Date of Patent: Jul. 22, 2014

(54) ENTERPRISE VULNERABILITY MANAGEMENT

(75) Inventor: Jason M. LaBumbard, Washington, DC (US)

(73) Assignee: Lockheed Martin Corporation, Bethesda, MD (US)

(*) Notice: Subject to any disclaimer, the term of this patent is extended or adjusted under 35 U.S.C. 154(b) by 92 days.

(21) Appl. No.: 13/442,636

(22) Filed: Apr. 9, 2012

(65) Prior Publication Data

US 2012/0304300 A1    Nov. 29, 2012

Related U.S. Application Data

(60) Provisional application No. 61/489,155, filed on May 23, 2011.

(51) Int. Cl.
*G06F 11/00*     (2006.01)
*G06F 12/14*     (2006.01)
*G06F 12/16*     (2006.01)
*G08B 23/00*     (2006.01)

(52) U.S. Cl.
USPC ........................................................ 726/25

(58) Field of Classification Search
USPC ........................................................ 726/25
See application file for complete search history.

(56) References Cited

U.S. PATENT DOCUMENTS

| 7,260,844 | B1 | 8/2007 | Tidwell et al. | |
|---|---|---|---|---|
| 7,624,422 | B2 | 11/2009 | Williams et al. | |
| 7,743,421 | B2 | 6/2010 | Cosquer et al. | |
| 2007/0067847 | A1* | 3/2007 | Wiemer et al. | 726/25 |
| 2007/0067848 | A1 | 3/2007 | Gustave et al. | |
| 2007/0180490 | A1 | 8/2007 | Renzi et al. | |
| 2007/0192867 | A1* | 8/2007 | Miliefsky | 726/25 |
| 2009/0007269 | A1* | 1/2009 | Bianco | 726/25 |
| 2009/0077666 | A1* | 3/2009 | Chen et al. | 726/25 |
| 2010/0192228 | A1 | 7/2010 | Levi | |
| 2010/0218256 | A1 | 8/2010 | Thomas et al. | |
| 2010/0275263 | A1* | 10/2010 | Bennett et al. | 726/25 |
| 2011/0138471 | A1* | 6/2011 | Van De Weyer et al. | 726/25 |

OTHER PUBLICATIONS

Mell, P.; Scarfone, K.; Romanosky, S., "Common Vulnerability Scoring System," Security & Privacy, IEEE , vol. 4, No. 6, pp. 85,89, Nov.-Dec. 2006 doi: 10.1109/MSP.2006.145 URL: http://ieeexplore.ieee.org/stamp/stamp.jsp?tp=&arnumber=4042667&isnumber=4042641.*
Gallon, L., "On the Impact of Environmental Metrics on CVSS Scores," Social Computing (SocialCom), 2010 IEEE Second International Conference on , vol., No., pp. 987,992, Aug. 20-22, 2010.*

(Continued)

*Primary Examiner* — Linglan Edwards
*Assistant Examiner* — Vu V Tran
(74) *Attorney, Agent, or Firm* — Marsh Fischmann & Breyfogle LLP

(57) ABSTRACT

An enterprise vulnerability management application (EVMA), enterprise vulnerability management process (EVMP) and system. In one embodiment, the EVMP may include executing computer software code on at least one computer hardware platform to receive login information from a user, inventory current information technology assets of the enterprise, conduct vulnerability scanning of the inventoried information technology assets, analyze vulnerability correlation and prioritization of the information technology assets, remediate one or more vulnerabilities of the information technology assets, and report to the user about the vulnerabilities and remediation undertaken. As part of the analysis, one or more vulnerability scores such as, for example, Common Vulnerability Scoring System (CVSS) scores, may be generated from base score metrics, temporal score metrics and environment score metrics.

5 Claims, 24 Drawing Sheets

(56) References Cited

OTHER PUBLICATIONS

Ali, A.; Zavarsky, P.; Lindskog, D.; Ruhl, R., "A software application to analyze the effects of temporal and environmental metrics on overall CVSS v2 score," Internet Security (WorldCIS), 2011 World Congress on , vol., No., pp. 109,113, Feb. 21-23, 2011.*

Mell, Peter; Scarfone, Karen and Romanosky, Sasha. A Complete Guide to the Common Vulnerability Scoring System Version 2.0. Common Vulnerability Scoring System (v2). pp. 1-23. Jun. 2007. Available online at http://www.first.org/cvss/cvss-guide.html.

* cited by examiner

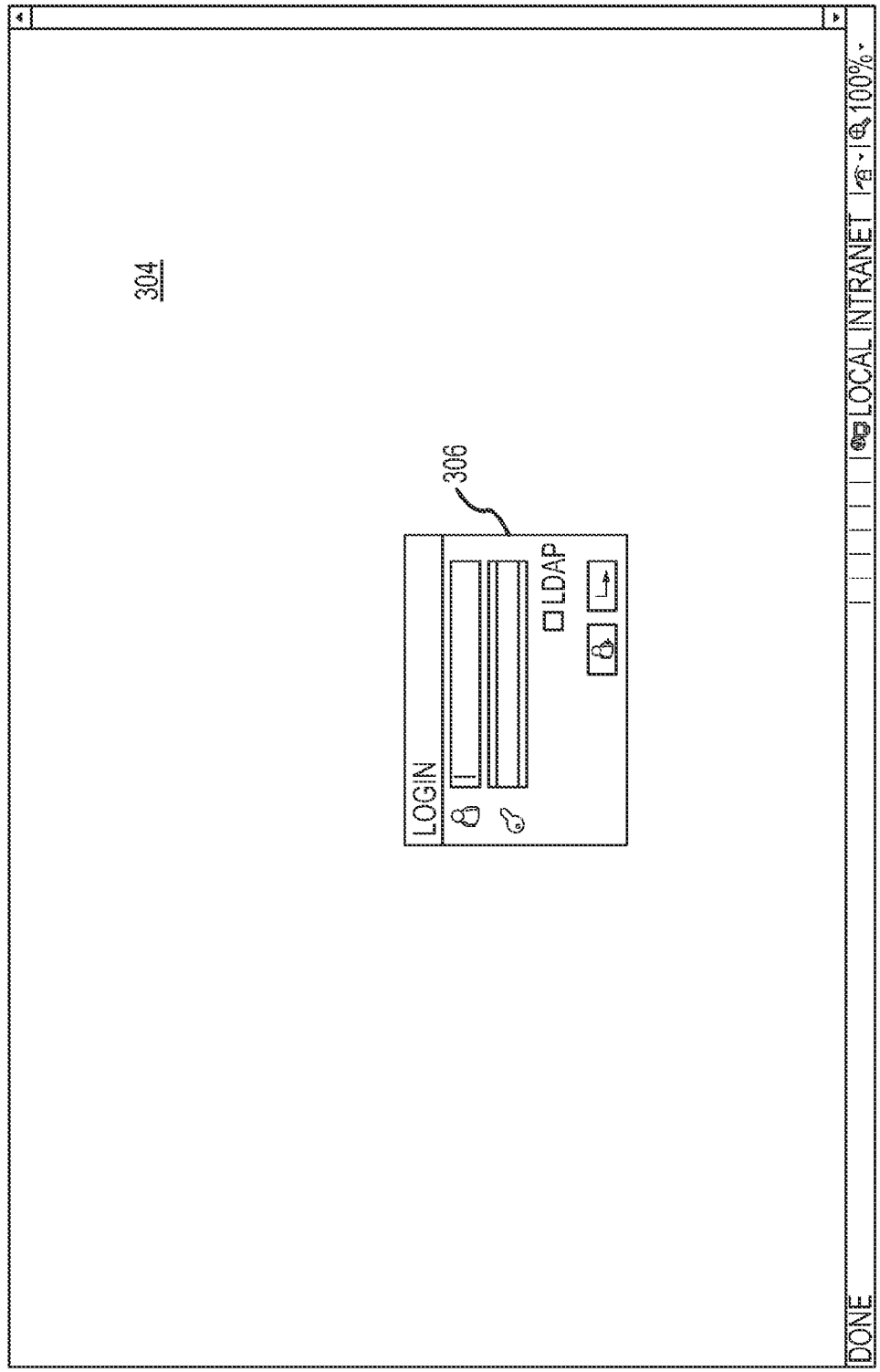

| CURRENT UNIQUE ISSUES | | | |
|---|---|---|---|
| NAME | BASE SCORE | ASSETS | MAX ENV. SCORE |
| WEB SERVER SUPPORTS WEAK SSL ENCRYPTION CERTIFICATES | 6.4 | 3 | 8.9 |
| NetBIOS NULL SESSION ENABLED | 7.1 | 5 | 8.6 |
| PERMISSION ON REGISTRY EXTENDED PROC | 8 | 4 | 8 |
| JBoss ENTERPRISE APPLICATION PLATFORM STATUS SERVLET REQUEST INFORMATION DISCLOSURE VULNERABILITY | 4.9 | 2 | 8 |
| EASILY-GUESSED PASSWORD | 8 | 4 | 8 |
| DBMS ACCOUNT PASSWORD EXPIRATION | 9.9 | 1 | 7.4 |
| DATABASE JOB/BATCH QUEUE MONITORING | 9.9 | 1 | 7.4 |
| DBMS APPLICATION OBJECT OWNERSHIP | 9.9 | 1 | 7.4 |
| DBMS DATA DEFINITION LANGUAGE USE | 9.9 | 1 | 7.4 |
| DBA OS PRIVILEGE ASSIGNMENT | 9.9 | 1 | 7.4 |
| DBMS SOFTWARE FILE BACKUPS | 9.9 | 1 | 7.4 |
| DBMS AUDIT LOG BACKUPS | 9.9 | 1 | 7.4 |
| DEDICATED DATA FILE DIRECTORIES | 9.9 | 1 | 7.4 |
| DBMS DEDICATED SOFTWARE DIRECTORY AND PARTITION | 9.9 | 1 | 7.4 |
| DBMS REMOTE SYSTEM CREDENTIAL USE AND ACCESS | 9.9 | 1 | 7.4 |
| SYSTEM TABLE PERMISSIONS | 9.9 | 1 | 7.4 |
| DBMS LINKS TO EXTERNAL DATABASES | 9.9 | 1 | 7.4 |
| DBMS SHARED ACCOUNT AUTHORIZATION | 9.9 | 1 | 7.4 |
| DBMS USER ACCOUNT AUTHORIZATION | 9.9 | 1 | 7.4 |
| DBMS PRIVILEGED ROLE ASSIGNMENTS | 9.9 | 1 | 7.4 |
| DBMS RESTORE PERMISSIONS | 9.9 | 1 | 7.4 |
| FIXED DATABASE ROLE MEMBERS | 9.9 | 1 | 7.4 |
| DBMS APPLICATION USER ROLE PRIVILEGE ASSIGNMENT | 9.9 | 1 | 7.4 |
| SMO AND DMO XPs ENABLED | 3.3 | 1 | 7.4 |
| ENCRYPTION OF DBMS SENSITIVE DATA IN TRANSIT | 9.9 | 1 | 7.4 |
| NetBIOS NBTSTAT-A | 5 | 4 | 7.2 |
| GUEST USER EXISTS IN DATABASE | 5 | 4 | 7 |
| UNAUTHORIZED OBJECT PERMISSION GRANTS | 5 | 4 | 7 |

ASSETS | SCANNING | SETTINGS | HELP | LOGOUT

ISSUES

CHARTS
UNIQUE ISSUES
ALL ISSUES

OPTIONS

CURRENT UNIQUE ISSUES

| NAME | BASE SCORE | ASSETS | MAX ENV. SCORE |
|---|---|---|---|
| WEB SERVER SUPPORTS WEAK SSL ENCRYPTION CERTIFICATES | 6.4 | 3 | 8.9 |
| NetBIOS NULL SESSION ENABLED | 7.1 | 5 | 8.6 |
| PERMISSION ON REGISTRY EXTENDED PROC | 8 | 4 | 8 |
| EASILY-GUESSED PASSWORD | 8 | 4 | 8 |
| DBMS ACCOUNT PASSWORD EXPIRATION | 9.9 | 1 | 7.4 |
| DATABASE JOB/BATCH QUEUE MONITORING | 9.9 | 1 | 7.4 |
| DBMS APPLICATION OBJECT OWNERSHIP | 9.9 | 1 | 7.4 |
| DBMS DATA DEFINITION LANGUAGE USE | 9.9 | 1 | 7.4 |
| DBA OS PRIVILEGE ASSIGNMENT | 9.9 | 1 | 7.4 |
| DBMS SOFTWARE FILE BACKUPS | 9.9 | 1 | 7.4 |
| DBMS AUDIT LOG BACKUPS | 9.9 | 1 | 7.4 |
| DEDICATED DATA FILE DIRECTORIES | 9.9 | 1 | 7.4 |
| DBMS DEDICATED SOFTWARE DIRECTORY AND PARTITION | 9.9 | 1 | 7.4 |
| DBMS REMOTE SYSTEM CREDENTIAL USE AND ACCESS | 9.9 | 1 | 7.4 |
| SYSTEM TABLE PERMISSIONS | 9.9 | 1 | 7.4 |
| DBMS LINKS TO EXTERNAL DATABASES | 9.9 | 1 | 7.4 |
| DBMS SHARED ACCOUNT AUTHORIZATION | 9.9 | 1 | 7.4 |
| DBMS USER ACCOUNT AUTHORIZATION | 9.9 | 1 | 7.4 |
| DBMS PRIVILEGED ROLE ASSIGNMENTS | 9.9 | 1 | 7.4 |
| DBMS RESTORE PERMISSIONS | 9.9 | 1 | 7.4 |
| FIXED DATABASE ROLE MEMBERS | 9.9 | 1 | 7.4 |
| DBMS APPLICATION USER ROLE PRIVILEGE ASSIGNMENT | 9.9 | 1 | 7.4 |
| SMO AND DMO XPs ENABLED | 9.9 | 1 | 7.4 |
| ENCRYPTION OF DBMS SENSITIVE DATA IN TRANSIT | 9.9 | 1 | 7.4 |
| NetBIOS NBTSTAT -A | 3.3 | 4 | 7.2 |
| GUEST USER EXISTS IN DATABASE | 5 | 4 | 7 |
| UNAUTHORIZED OBJECT PERMISSION GRANTS | 5 | 4 | 7 |

ISSUE DETAILS — 372

NAME:
NetBIOS NULL SESSION ENABLED

CVE ID(s):
CVE-1999-0506

BASE SCORE / SEVERITY:
7.1 / HIGH

SUMMARY:
NetBIOS NULL SESSIONS ARE ENABLED ON THE HOST.

DETAILS:
A NetBIOS NULL SESSION ALLOWS USERS TO CONNECT TO A HOST REMOTELY WITH NO USERNAME AND PASSWORD AND PERFORM A LIMITED SET OF ADMINISTRATIVE TASKS. NULL SESSIONS ALLOW THE REMOTE USER TO GATHER INFORMATION SUCH AS:

1. LIST USERS
2. LIST GROUPS
3. LIST SHARES (INCLUDING HIDDEN SHARES)
4. POLICIES (SUCH AS MINIMUM PASSWORD LENGTH, ETC.)

RECOMMENDATION:
TO PREVENT NET BIOS NULL SESSION SHARE ENUMERATION BLOCK ACCESS TO TCP...

DONE — LOCAL INTRANET — 100%

| | NAME | ASSET | ENV. SCORE |
|---|---|---|---|
| | AGENT XPs ENABLED | DOCUMENT DB | 4 |
| | APPLICATION USER ACCESS TO EXTERNAL OBJECTS | DOCUMENT DB | 4 |
| | APPLICATION/CUSTOM STORED PROCEDURE ENCRYPTION | DOCUMENT DB | 4 |
| | AUDITING OF SECURITY EVENTS | DOCUMENT DB | 7 |
| | AUDITING OF SUCCESSFUL LOGINS | PRESCRIPTION DB | 4 |
| | AUDITING OF SUCCESSFUL LOGINS | DOCUMENT DB | 4 |
| | AUDITING OF SUCCESSFUL LOGINS | CHARTS DB | 1.4 |
| | AUDITING OF SUCCESSFUL LOGINS | RECORDS DB | 0.1 |
| | AUDITING OF SUCCESSFUL LOGINS | EMPLOYEE RECORDS DB | 2.1 |
| | C2 AUDIT MODE | RECORDS DB | 0.1 |
| | C2 AUDIT MODE | PRESCRIPTION DB | 7 |
| | C2 AUDIT MODE | CHARTS DB | 1.4 |
| | C2 AUDIT MODE | DOCUMENT DB | 4 |
| | C2 AUDIT MODE | EMPLOYEE RECORDS DB | 2.1 |
| | COOKIE VULNERABILITIES | COMPENSATION APPLICATION | 0 |
| | CRITICAL DBMS FILES FAULT PROTECTION | DOCUMENT DB | 4 |
| | CROSS-FRAME SCRIPTING | COMPENSATION APPLICATION | 0 |
| | CROSS-FRAME SCRIPTING | EDUCATION APPLICATION | 0 |
| | CROSS-FRAME SCRIPTING | RADIOLOGY SYSTEM | 1.1 |
| | DBA OS PRIVILEGE ASSIGNMENT | DOCUMENT DB | 7.4 |
| | DBMS RESTORE PERMISSIONS | DOCUMENT DB | 7.4 |
| | DBMS ACCESS TO EXTERNAL LOCAL EXECUTABLES | DOCUMENT DB | 4 |
| | DBMS ACCOUNT PASSWORD EXPIRATION | DOCUMENT DB | 7.4 |
| | DBMS APPLICATION OBJECT OWNER ACCOUNTS | DOCUMENT DB | 7.4 |
| | DBMS APPLICATION OBJECT OWNERSHIP | DOCUMENT DB | 7.4 |
| | DBMS APPLICATION USER ROLE PRIVILEGE ASSIGNMENT | DOCUMENT DB | 7.4 |
| | DBMS AUDIT LOG BACKUPS | DOCUMENT DB | 7.4 |
| | DBMS DATA DEFINITION LANGUAGE USE | DOCUMENT DB | 7.4 |
| | DBMS DEDICATED SOFTWARE DIRECTORY AND PARTITIONS | DOCUMENT DB | 7.4 |

392

ENTERPRISE VULNERABILITY MANAGEMENT

RELATED APPLICATION INFORMATION

This application claims priority from U.S. Provisional Application Ser. No. 61/489,155 entitled "ENTERPRISE VULNERABILITY MANAGEMENT" filed on May 23, 2011, which is incorporated by reference herein in its entirety.

FIELD OF THE INVENTION

The present invention relates generally to information technology system security, and more particularly to managing the identification, analysis, and remediation of vulnerabilities of the information technology assets of an enterprise.

BACKGROUND OF THE INVENTION

There are three major challenges facing today's IT security team that impact their ability to provide a secure environment for their enterprise.

The first problem is the increasing proliferation of databases and web applications as Web 2.0 and more software solutions are being utilized throughout an enterprise. Today, we are seeing IT solutions being utilized to increase productivity and mission effectiveness. New technologies (such as cloud computing, web 2.0, and COTS\FOSS solutions) that provide data sharing between organizations are becoming prolific. As increases in IT investments continues, the complexity and sheer number of web applications, databases, servers and network device infrastructure have become a management challenge.

The second problem is the singular focus on server assets, with limited or stove-piped management of other asset types. The focus in the past has been on server inventory and configuration management concerns (ensuring that servers and network devices have proper settings) rather than cyber vulnerabilities. In addition to being unfamiliar with vulnerability analysis, organizations often implement several commercial cyber tools that are specific to each asset type. Vulnerabilities are then individually evaluated within a specific asset type, rather than from a more holistic, enterprise view. The analysis needs to shift its focus to what is most important to the entire IT enterprise, and not what is most important for an individual set of servers or databases. With the limited budget and resources available in many organizations today, the most critical vulnerabilities in the environment need to be identified and remediated quickly. Without an integrated view, the security team is challenged to identify the greatest threats to their mission or enterprise.

The third problem is the increasing number of vulnerabilities and threats, in an environment where the enterprise is constantly evolving. As new vulnerabilities are constantly being found by hacker organizations, it is a challenge for the security team to stay current on the most up-to-date software patches and cyber best practices. If only the vulnerabilities and threats were changing, then the problem would be daunting enough. However, new assets are being added to the enterprise on a routine basis, configuration changes are being made to support operations, and vulnerabilities are constantly being fixed; all of which contributes to a constantly changing baseline. All of these problems lead to a very reactive process that is time consuming, and as such doesn't effectively protect the enterprise environment.

There are two major goals of the vulnerability management process that cannot be met with a reactive process: the first goal is to keep the environment secure, and the second goal is to keep the environment compliant. With the stove-piped, complex, and time-consuming process that exists today, it is difficult to keep the enterprise environment secure and compliant.

SUMMARY OF THE INVENTION

The present invention provides an enterprise vulnerability management application (EVMA) and enterprise vulnerability management process (EVMP) that recognize that a simplified, more robust technology is needed to help the security team accomplish the previously mentioned goals in an efficient manner.

The EVMA/EVMP is capable, for example, of the following:
 ingesting cyber vulnerability data from multiple embedded or external COTS scanning tools regardless of vendor;
 enhancing/normalizing the COTS tool vulnerability output to be compatible with the NIST CVSS algorithm;
 implementing all components of the CVSS algorithm by incorporating infrastructure criticality information into the scoring system to augment the vulnerability information, while utilizing real-time vulnerability ratings from an external database;
 presenting the resulting prioritized list of vulnerabilities to the user in an easy to understand format that enables data analysis across COTS scanning tools and provides access to relevant fixes to identified vulnerabilities; and
 standardizing remediation action format to present COTS tool remediation output to the user.

Further, the EVMA/EVMP solution/methodology results in a one stop shop for identifying, prioritizing, and resolving cyber vulnerabilities across an entire network. From a customer's perspective, this solution provides them with far more flexibility than any other existing solution, if any solution exists. This solution is vendor agnostic so a customer is not tied to any specific tools. This solution also provides customers with the flexibility to change tools and add new capabilities more easily as their requirements adjust.

The EVMA/EVMP solution/methodology offers the following key discriminators:
 A common framework interface that supports multiple vendor products, allowing a solution to be quickly tailored to a specific customer's IT environment and threat exposure. As vendor products adapt discriminating 'cutting edge' capabilities (scanning of software applications, web applications and databases; remediation capabilities; and security analytics), they can be quickly incorporated into the EVMA/EVMP solution/methodology.
 A user interface that provides the visualization necessary for decision makers to understand and prioritize threats against different parts of their IT enterprise and to allocate limited Tier 2 service providers to the highest value activities.
 A modular design that allows other capabilities within the cyber security domain to be quickly incorporated into the data analysis and remediation management components.

Accordingly, in one aspect a computer-implemented method for managing vulnerability of information technology assets of an enterprise is provided. The method may include executing computer software code on at least one computer hardware platform. When executed, the software code enables the at least one hardware platform to perform the steps of: receiving login information from a user; inventorying current information technology assets of the enterprise; conducting vulnerability scanning of the inventoried information technology assets; analyzing vulnerability correlation and prioritization of the information technology assets, wherein said analyzing includes generating one or more vulnerability scores; remediating one or more vulnerabilities of the information technology assets; and reporting to the user about the vulnerabilities and remediation undertaken. In this regard, the vulnerability scores may, for example, be Common Vulnerability Scoring System (CVSS) scores generated from base score metrics, temporal score metrics and environment score metrics.

In another aspect, an enterprise vulnerability management system is provided. The enterprise vulnerability management system may include a processing module and a memory module logically connected to the processing module and comprising a set of computer readable instructions executable by the processing module to: receive login information from a user; inventory current information technology assets of the enterprise; conduct vulnerability scanning of the inventoried information technology assets; analyze vulnerability correlation and prioritization of the information technology assets, wherein one or more vulnerability scores are generated; remediate one or more vulnerabilities of the information technology assets; and report to the user about the vulnerabilities and remediation undertaken. In this regard, the vulnerability scores may, for example, be CVSS scores generated from base score metrics, temporal score metrics and environment score metrics.

In another aspect, a method for generating a vulnerability score associated with an information technology assets of an enterprise is provided. The method for generating a vulnerability score may include collecting results of at least one vulnerability assessment conducted on the information technology assets by at least one vendor tool; analyzing each result for base score metrics; analyzing each result for temporal score metrics; analyzing each result for environment score metrics; and generating a CVSS score for each result based on the base score metrics, temporal score metrics and environment score metrics for each result. In one example, the steps of the method may be performed on a computer hardware platform having a processing module executing computer program code stored on a memory module of the computer hardware platform.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIG. 3B depicts a login screen of a computer implemented EVMP as may be displayed to a user on a display screen;

FIGS. 3G-3J depict several visual outputs relating to the scanning portion of the computer implemented EVMP as may be displayed to a user on a display screen;

FIGS. 3L-3O depict several visual outputs relating to the analysis portion of the computer implemented EVMP as may be displayed to a user on a display screen;

FIGS. 3Q-3S depict several visual outputs relating to the analysis portion of the computer implemented EVMP as may be displayed to a user on a display screen;

FIGS. 3U-3V depict several visual outputs relating to the reporting portion of the computer implemented EVMP as may be displayed to a user on a display screen.

DETAILED DESCRIPTION

Figure 1:
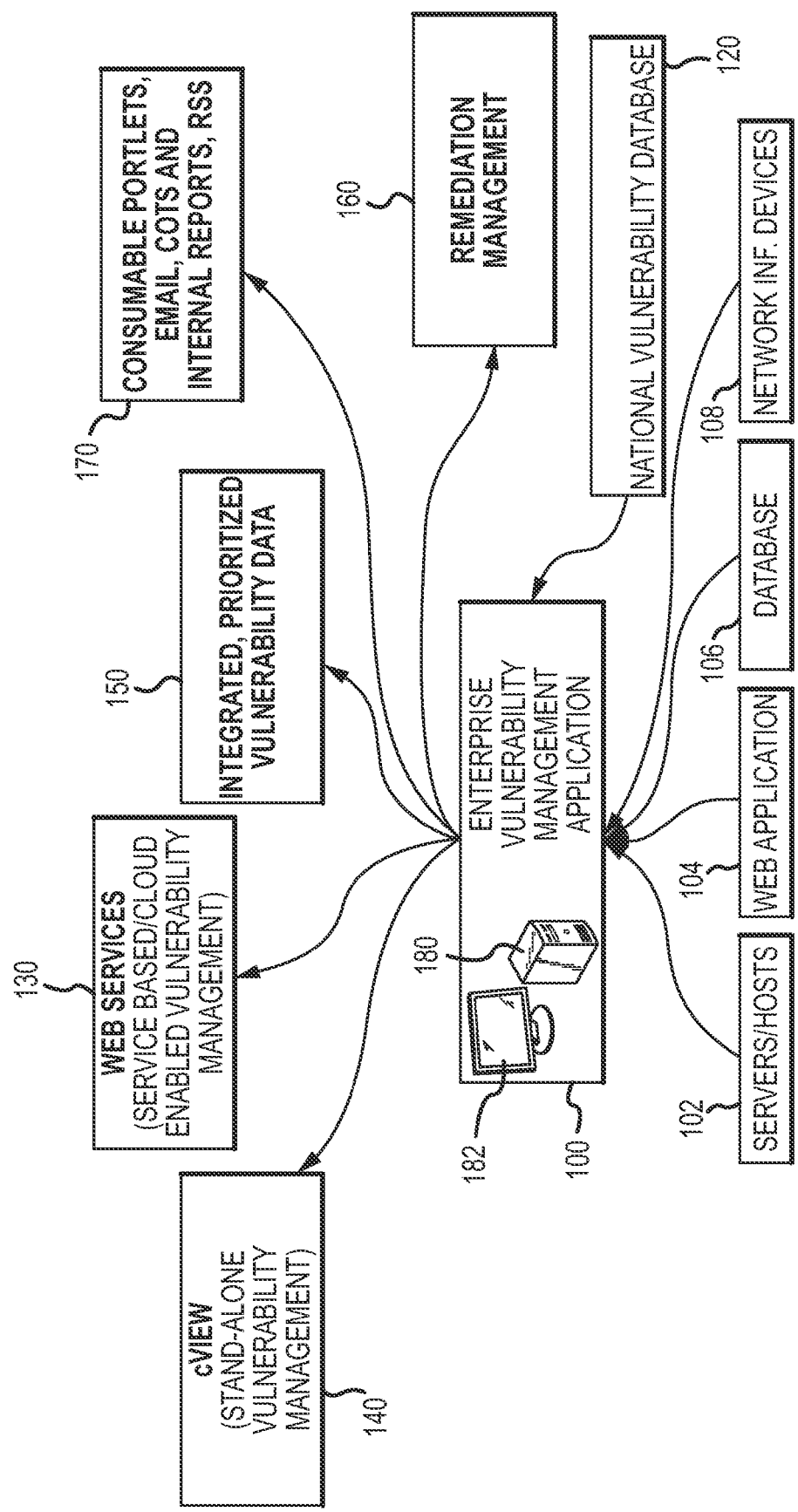
FIG. 1 is a schematic representation providing an overview of an enterprise vulnerability management application (EVMA) that integrates and manages the operation of disparate scanning and maintenance tools for various network assets and provides various outputs relating to the network assets.

Referring to FIG. 1, the EVMA 100 supports various types of assets including, for example, servers/hosts 102, web applications 104, databases 106, and network interface devices 108 such as, for example, end-points, switches, routers and firewalls. The EVMA interfaces with and manages the operation of disparate scanning and/or maintenance tools to rapidly scan the network to discover asset inventory and assess vulnerabilities. In this regard, the EVMA may interface with and manage different scanning and/or maintenance tools specifically designed for the different asset types such as provided by third party vendors. The EVMA correlates data automatically and across asset types input to the EVMA from the disparate scanning and/or maintenance tools. The EVMA also prioritizes vulnerabilities based upon the Common Vulnerability Scoring System (CVSS) and the National Vulnerability Database (NVD) 120 maintained by the National Institute of Standards and technology (NIST). In this regard, the EVMA may receive data from the NVD 120 as an input. The EVMA also manages the entire workflow from asset discovery through vulnerability remediation. The EVMA further provides intuitive visualizations. In this regard, the EVMA may provide as outputs information to web services including service based/cloud enabled vulnerability management applications 130, information displayed to a user in a stand-alone vulnerability management viewer 140, integrated, prioritized vulnerability data 150 displayed to a user, information to a remediation management application 160, and information to consumable portlets, email, commercial off-the-shelf (COTS) and internal reports, really simple syndication (RSS) feeds 170.

The EVMA 100 may, for example, be implemented as computer readable instructions (e.g. computer software) loadable (e.g. from a non-volatile storage media) onto a memory module of a computer hardware platform 180 for execution by a processing module of the computer hardware platform 180. The computer hardware platform 180 may access the various information technology assets (e.g. the servers/hosts 102, web applications 104, databases 106, and network interface devices 108) of the enterprise as well as the NVD 120 via public and/or private data networks. Although only one computer hardware platform 180 is illustrated in FIG. 1, the EVMA 100 may be implemented for parallel execution across a plurality of computer hardware platforms and/or a plurality of processing modules of a single computer hardware platform. One or more of the various outputs 130, 140, 150, 160, 170 of the EVMA 100 may be displayed to a user on one or more displays 182 in communication with the processing module(s) of the computer hardware platform(s) 180.

Figure 2:
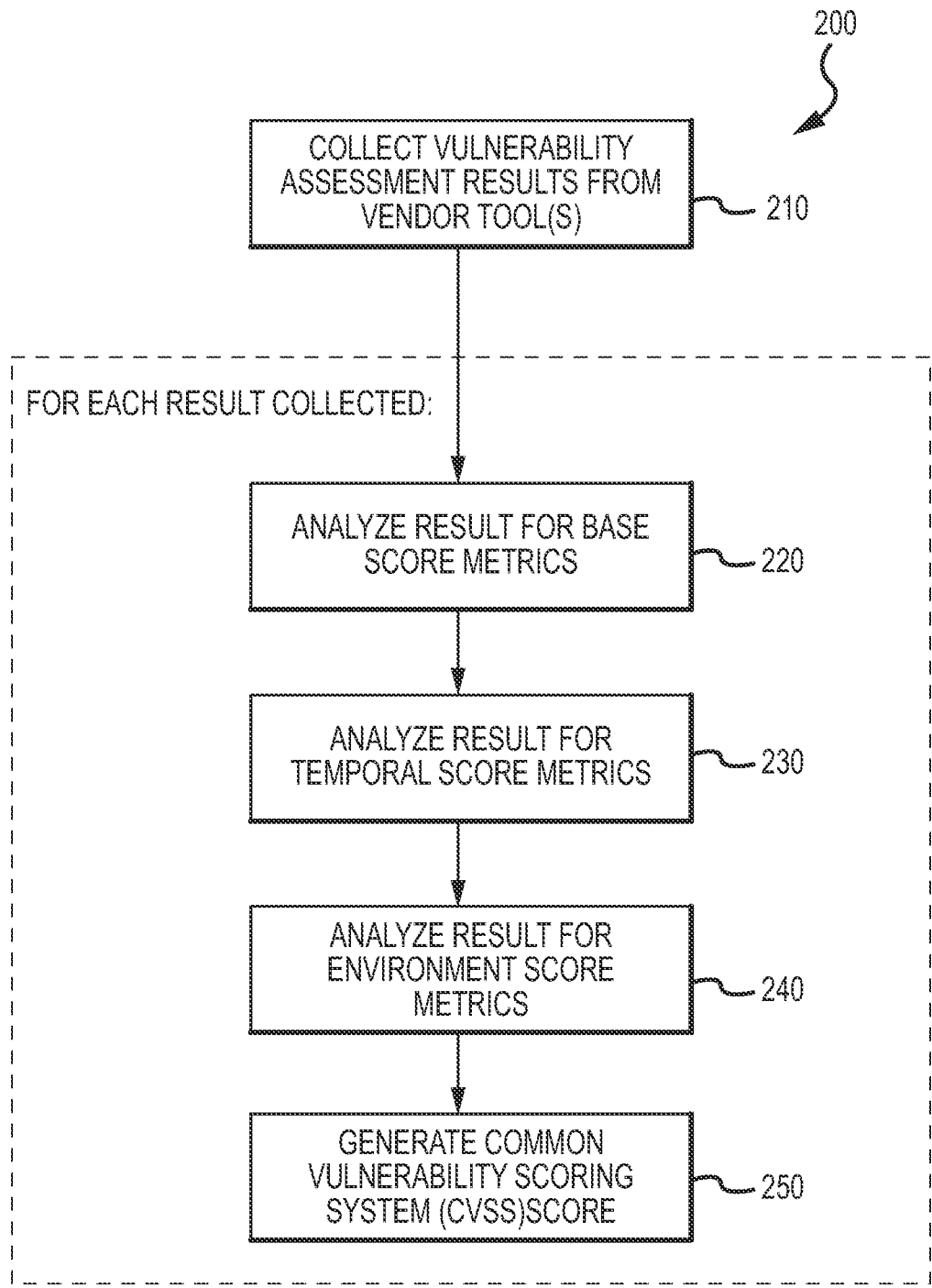
FIG. 2 is a flow chart showing one embodiment of vulnerability scoring process that may be implemented by the EVMA.

Referring to FIG. 2, the EVMA may implement a process (200) for generating a vulnerability score that includes the following process steps:

Collect results (210) from vulnerability assessment from vendor tool(s)
For each result:
   Analyze result for base score metrics (220)
   Analyze result for temporal score metrics (230)
   Analyze result for environment score metrics (240)
   Generate CVSS scores (250)

The sub-step (220) of analyzing each result for a base score may proceed as follows:

```
Get NVD information
If Common Vulnerabilities and Exposures (CVE) present
    Retrieve CVSS base score metrics from NVD repository
ElseIf CWE present
    If CWE is mapped to CVE(s)
        Retrieve CVSS base score metrics for associated CVE from
        NVD repository
        If multiple CVEs retrieved
            >   Generate "pseudo" CVE (with CVSS base score
                metrics) from retrieved CVE(s)
    Else
        Generate "pseudo" CVE (with CVSS base score metrics)
        based on result details
Else
    Generate "pseudo" CVE (with CVSS base score metrics) based on
    result details
```

The sub-step (230) of analyzing each result for a temporal score may proceed as follows:

```
Get 'CVE'
If NVD temporal score indicator
    Retrieve CVSS temporal score metrics from NVD repository
ElseIf outside source temporal score indicator
    Analyze 'CVE' links to determine if temporal score metrics
    available from outside source
    If outside source has temporal information
        Retrieve CVSS temporal score metrics from outside
        repository
ElseIf temporal score can be calculated
    Generate "pseudo" CVE (with temporal score metrics) based on
    result details
Else
    Use default temporal score metrics
```

The sub-step (240) of analyzing each result for an environment score may proceed as follows:

```
Get asset associated with result
If user provided environment score indicator
    Retrieve CVSS environment score metrics from EVMA
    repository
    If asset valuation algorithm (AVA) provided environment score
    indicator
        Retrieve CVSS environment score metrics from
        EVMA\AVA repository
        Blend environment score metrics
ElseIf AVA provided environment score indicator
    Retrieve CVSS environment score metrics from EVMA\AVA
    repository
Else
    Use default environment score metrics
```

The metrics that may be analyzed in sub-steps (220), (230) and (240) may, for example, be consistent with the metrics described in the June 2007 publication by Mell, Peter et al. entitled "CVSS A Complete Guide to the Common Vulnerability Scoring System Version 2.0" (available online at http://www.first.org/cvss/cvss-guide.html) from the Forum of Incident Response and Security Teams (FIRST) (http://www.first.org). Various base metrics that may be analyzed in sub-step (220), one manner of generating the base metrics, various temporal metrics that may be analyzed in sub-step (230), and one manner of generating the temporal metrics are described below.

Base Metrics

The base metric group captures the characteristics of a vulnerability that are constant with time and across user environments. The Access Vector, Access Complexity, and Authentication metrics capture how the vulnerability is accessed and whether or not extra conditions are required to exploit it. The three impact metrics measure how a vulnerability, if exploited, will directly affect an IT asset, where the impacts are independently defined as the degree of loss of confidentiality, integrity, and availability. For example, a vulnerability could cause a partial loss of integrity and availability, but no loss of confidentiality.

The generation of the base score metrics may proceed in one of two manners, simple or advanced, as described below:

Simple
   Retrieve vulnerability details from vendor repository
   'Normalize' score
Advanced
   Access Vector
     What type of asset is this?
     What type of scan is this—credentialed audit, non-credentialed audit, penetration?
     What is the control flagged as in the tool?
   Access Complexity
     What type of asset is this?
     What is the control flagged as in the tool?
   Authentication
     What type of scan is this—credentialed audit, non-credentialed audit, penetration?
     What is the control flagged as in the tool?
   Confidentiality Impact
     What type of asset is this?
     What is the control flagged as in the tool?
   Integrity Impact
     What type of asset is this?
     What is the control flagged as in the tool?
   Availability Impact
     What type of asset is this?
     What is the control flagged as in the tool?

The advanced manner of generating base score metrics leverages rules to determine which characteristics are analyzed for each metric and what values should be used based on those characteristics. The different base metric vectors are described in further detail below:

2.1.1. Access Vector (AV)

This metric reflects how the vulnerability is exploited. The possible values for this metric are listed in Table 1. The more remote an attacker can be to attack a host, the greater the vulnerability score.

TABLE 1

| AV Metric | Metric Value Description |
|---|---|
| Local (L) | A vulnerability exploitable with only local access requires the attacker to have either physical access to the vulnerable system or a local (shell) account. Examples of locally exploitable vulnerabilities are peripheral attacks such as Firewire/USB DMA attacks, and local privilege escalations (e.g., sudo). |
| Adjacent Network (A) | A vulnerability exploitable with adjacent network access requires the attacker to have access to either the broadcast or collision domain of the vulnerable software. Examples of local networks include local IP subnet, Bluetooth, IEEE 802.11, and local Ethernet segment. |
| Network (N) | A vulnerability exploitable with network access means the vulnerable software is bound to the network stack and the attacker does not require local network access or local access. Such a vulnerability is often termed "remotely exploitable". An example of a network attack is an RPC buffer overflow. |

2.1.2. Access Complexity (AC)

This metric measures the complexity of the attack required to exploit the vulnerability once an attacker has gained access to the target system. For example, consider a buffer overflow in an Internet service: once the target system is located, the attacker can launch an exploit at will. Other vulnerabilities, however, may require additional steps in order to be exploited. For example, a vulnerability in an email client is only exploited after the user downloads and opens a tainted attachment. The possible values for this metric are listed in Table 2. The lower the required complexity, the higher the vulnerability score.

TABLE 2

| AC Metric | Metric Value Description |
|---|---|
| High (H) | Specialized access conditions exist. For example: In most configurations, the attacking party must already have elevated privileges or spoof additional systems in addition to the attacking system (e.g., DNS hijacking). The attack depends on social engineering methods that would be easily detected by knowledgeable people. For example, the victim must perform several suspicious or atypical actions. The vulnerable configuration is seen very rarely in practice. If a race condition exists, the window is very narrow. |
| Medium (M) | The access conditions are somewhat specialized; the following are examples: The attacking party is limited to a group of systems or users at some level of authorization, possibly untrusted. Some information must be gathered before a successful attack can be launched. The affected configuration is non-default, and is not commonly configured (e.g., a vulnerability present when a server performs user account authentication via a specific scheme, but not present for another authentication scheme). The attack requires a small amount of social engineering that might occasionally fool cautious users (e.g., phishing attacks that modify a web browsers status bar to show a false link, having to be on someone's buddy list before sending an IM exploit). |
| Low (L) | Specialized access conditions or extenuating circumstances do not exist. The following are examples: The affected product typically requires access to a wide range of systems and users, possibly anonymous and untrusted (e.g., Internet-facing web or mail server). The affected configuration is default or ubiquitous. The attack can be performed manually and requires little skill or additional information gathering. The race condition is a lazy one (i.e., it is technically a race but easily winnable). |

2.1.3. Authentication (Au)

This metric measures the number of times an attacker must authenticate to a target in order to exploit a vulnerability. This metric does not gauge the strength or complexity of the authentication process, only that an attacker is required to provide credentials before an exploit may occur. The possible values for this metric are listed in Table 3. The fewer authentication instances that are required, the higher the vulnerability score.

TABLE 3

| Au Metric | Metric Value Description |
|---|---|
| Multiple (M) | Exploiting the vulnerability requires that the attacker authenticate two or more times, even if the same credentials are used each time. An example is an attacker authenticating to an operating system in addition to providing credentials to access an application hosted on that system. |
| Single (S) | The vulnerability requires an attacker to be logged into the system (such as at a command line or via a desktop session or web interface). |
| None (N) | Authentication is not required to exploit the vulnerability. |

The metric should be applied based on the authentication the attacker requires before launching an attack. For example, if a mail server is vulnerable to a command that can be issued before a user authenticates, the metric should be scored as "None" because the attacker can launch the exploit before credentials are required. If the vulnerable command is only available after successful authentication, then the vulnerability should be scored as "Single" or "Multiple," depending on how many instances of authentication must occur before issuing the command.

2.1.4. Confidentiality Impact (C)

This metric measures the impact on confidentiality of a successfully exploited vulnerability. Confidentiality refers to limiting information access and disclosure to only authorized users, as well as preventing access by, or disclosure to, unauthorized ones. The possible values for this metric are listed in Table 4. Increased confidentiality impact increases the vulnerability score.

TABLE 4

| C Metric | Metric Value Description |
|---|---|
| None (N) | There is no impact to the confidentiality of the system. |
| Partial (P) | There is considerable informational disclosure. Access to some system files is possible, but the attacker does not have control over what is obtained, or the scope of the loss is constrained. An example is a vulnerability that divulges only certain tables in a database. |
| Complete (C) | There is total information disclosure, resulting in all system files being revealed. The attacker is able to read all of the system's data (memory, files, etc.) |

2.1.5. Integrity Impact (I)

This metric measures the impact to integrity of a successfully exploited vulnerability. Integrity refers to the trustworthiness and guaranteed veracity of information. The possible values for this metric are listed in Table 5. Increased integrity impact increases the vulnerability score.

TABLE 5

| I Metric | Metric Value Description |
|---|---|
| None (N) | There is no impact to the integrity of the system. |
| Partial (P) | Modification of some system files or information is possible, but the attacker does not have control over what can be modified, or the scope of what the attacker can affect is limited. For example, system or application files may be overwritten or modified, but either the attacker has no control over which files are affected or the attacker can modify files within only a limited context or scope. |
| Complete (C) | There is a total compromise of system integrity. There is a complete loss of system protection, resulting in the entire system being compromised. The attacker is able to modify any files on the target system. |

2.1.6 Availability Impact (A)

This metric measures the impact to availability of a successfully exploited vulnerability. Availability refers to the accessibility of information resources. Attacks that consume network bandwidth, processor cycles, or disk space all impact the availability of a system. The possible values for this metric are listed in Table 6. Increased availability impact increases the vulnerability score.

TABLE 6

| A Metric | Metric Value Description |
|---|---|
| None (N) | There is no impact to the availability of the system. |
| Partial (P) | There is reduced performance or interruptions in resource availability. An example is a network-based flood attack that permits a limited number of successful connections to an Internet service. |
| Complete (C) | There is a total shutdown of the affected resource. The attacker can render the resource completely unavailable. |

Temporal Metrics

The threat posed by a vulnerability may change over time. Three such factors that CVSS captures are: confirmation of the technical details of a vulnerability, the remediation status of the vulnerability, and the availability of exploit code or techniques. Since temporal metrics are optional they each include a metric value that has no effect on the score. This value is used when the user feels the particular metric does not apply and wishes to "skip over" it.

The generation of temporal score metrics may involve a number of considerations as described below:

Exploitability
  Does remediation system have previous ticket associated with this issue? If so, is exploit flag indicated?
  Can it be determined if there is an exploit from tool information?
Remediation
  Does remediation system have previous ticket associated with this issue? If so, was it able to be resolved?
  Can it be determined if there is a fix from tool information?
Report Confidence
  Does remediation system have previous ticket associated with this issue?
  Has this issue always been flagged as false positive?
  Has this vulnerability been present in multiple scans?
  How long since this vulnerability was added to system (NVD or tool)?

The different temporal metric vectors are described in further detail below:

2.2.1. Exploitability (E)

This metric measures the current state of exploit techniques or code availability. Public availability of easy-to-use exploit code increases the number of potential attackers by including those who are unskilled, thereby increasing the severity of the vulnerability.

Initially, real-world exploitation may only be theoretical. Publication of proof of concept code, functional exploit code, or sufficient technical details necessary to exploit the vulnerability may follow. Furthermore, the exploit code available may progress from a proof-of-concept demonstration to exploit code that is successful in exploiting the vulnerability consistently. In severe cases, it may be delivered as the payload of a network-based worm or virus. The possible values for this metric are listed in Table 7. The more easily a vulnerability can be exploited, the higher the vulnerability score.

TABLE 7

| E Metric | Metric Value Description |
|---|---|
| Unproven (U) | No exploit code is available, or an exploit is entirely theoretical. |
| Proof-of-Concept (POC) | Proof-of-concept exploit code or an attack demonstration that is not practical for most systems is available. The code or technique is not functional in all situations and may require substantial modification by a skilled attacker. |
| Functional (F) | Functional exploit code is available. The code works in most situations where the vulnerability exists. |
| High (H) | Either the vulnerability is exploitable by functional mobile autonomous code, or no exploit is required (manual trigger) and details are widely available. The code works in every situation, or is actively being delivered via a mobile autonomous agent (such as a worm or virus). |
| Not Defined (ND) | Assigning this value to the metric will not influence the score. It is a signal to the equation to skip this metric. |

2.2.2. Remediation Level (RL)

The remediation level of a vulnerability is an important factor for prioritization. The typical vulnerability is unpatched when initially published. Workarounds or hotfixes may offer interim remediation until an official patch or upgrade is issued. Each of these respective stages adjusts the temporal score downwards, reflecting the decreasing urgency as remediation becomes final. The possible values for this metric are listed in Table 8. The less official and permanent a fix, the higher the vulnerability score is.

TABLE 8

| RL Metric | Metric Value Description |
| --- | --- |
| Official Fix (OF) | A complete vendor solution is available. Either the vendor has issued an official patch, or an upgrade is available. |
| Temporary Fix (TF) | There is an official but temporary fix available. This includes instances where the vendor issues a temporary hotfix, tool, or workaround. |
| Workaround (W) | There is an unofficial, non-vendor solution available. In some cases, users of the affected technology will create a patch of their own or provide steps to work around or otherwise mitigate the vulnerability. |
| Unavailable (U) | There is either no solution available or it is impossible to apply. |
| Not Defined (ND) | Assigning this value to the metric will not influence the score. It is a signal to the equation to skip this metric. |

2.2.3. Report Confidence (RC)

This metric measures the degree of confidence in the existence of the vulnerability and the credibility of the known technical details. Sometimes, only the existence of vulnerabilities are publicized, but without specific details. The vulnerability may later be corroborated and then confirmed through acknowledgement by the author or vendor of the affected technology. The urgency of a vulnerability is higher when a vulnerability is known to exist with certainty. This metric also suggests the level of technical knowledge available to would-be attackers. The possible values for this metric are listed in Table 9. The more a vulnerability is validated by the vendor or other reputable sources, the higher the score.

TABLE 9

| RC Metric | Metric Value Description |
| --- | --- |
| Unconfirmed (UC) | There is a single unconfirmed source or possibly multiple conflicting reports. There is little confidence in the validity of the reports. An example is a rumor that surfaces from the hacker underground. |
| Uncorroborated (UR) | There are multiple non-official sources, possibly including independent security companies or research organizations. At this point there may be conflicting technical details or some other lingering ambiguity. |
| Confirmed (C) | The vulnerability has been acknowledged by the vendor or author of the affected technology. The vulnerability may also be Confirmed when its existence is confirmed from an external event such as publication of functional or proof-of-concept exploit code or widespread exploitation. |
| Not Defined (ND) | Assigning this value to the metric will not influence the score. It is a signal to the equation to skip this metric. |

Figure 3A:
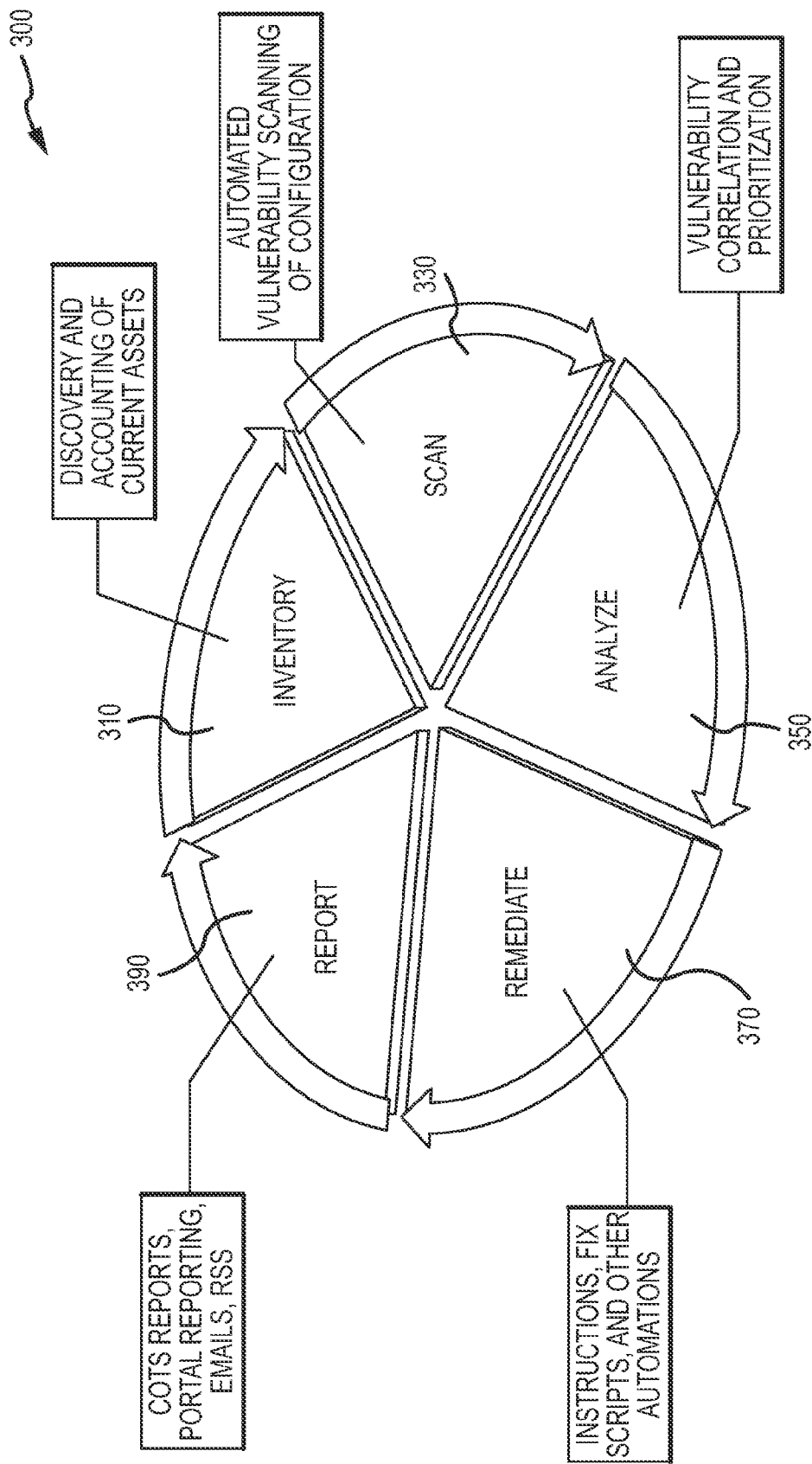
FIG. 3A provides an overview of one embodiment of an enterprise vulnerability management process (EVMP) including inventory, scanning, analysis, remediation and reporting portions.
Figure 3C:
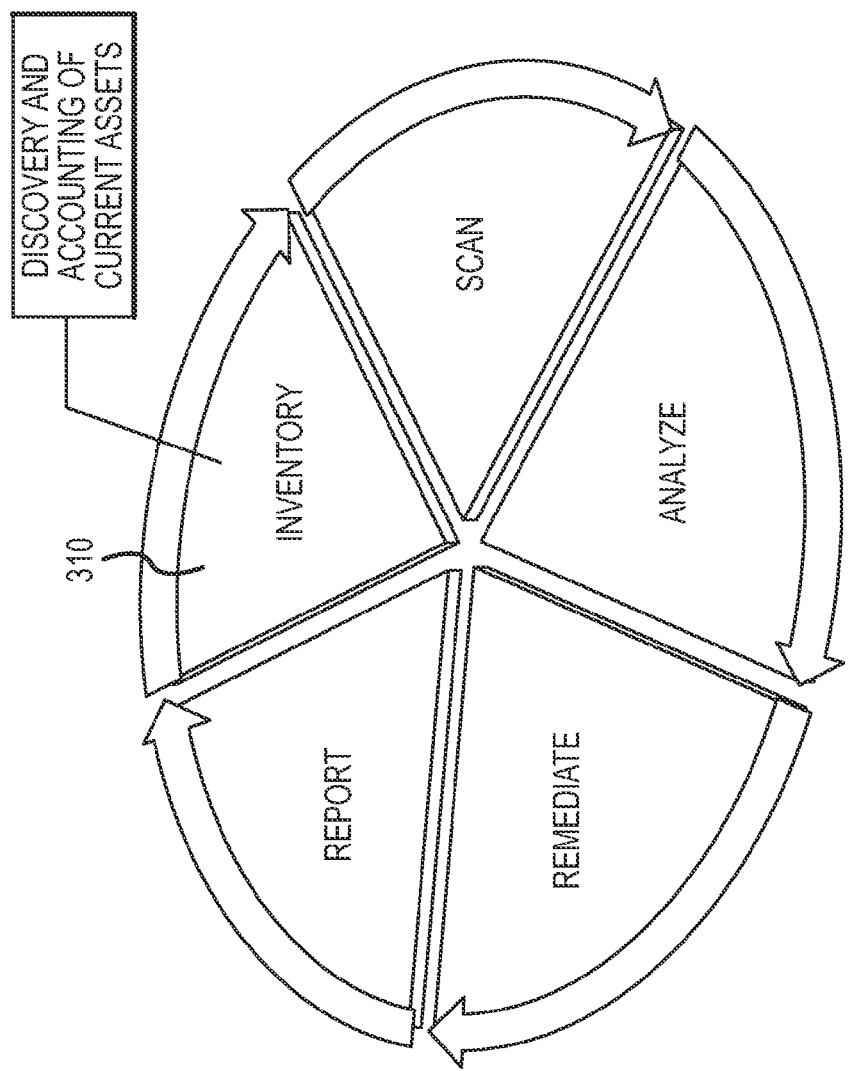
FIG. 3C provides an overview of the inventory portion of the EVMP.
Figure 3D:
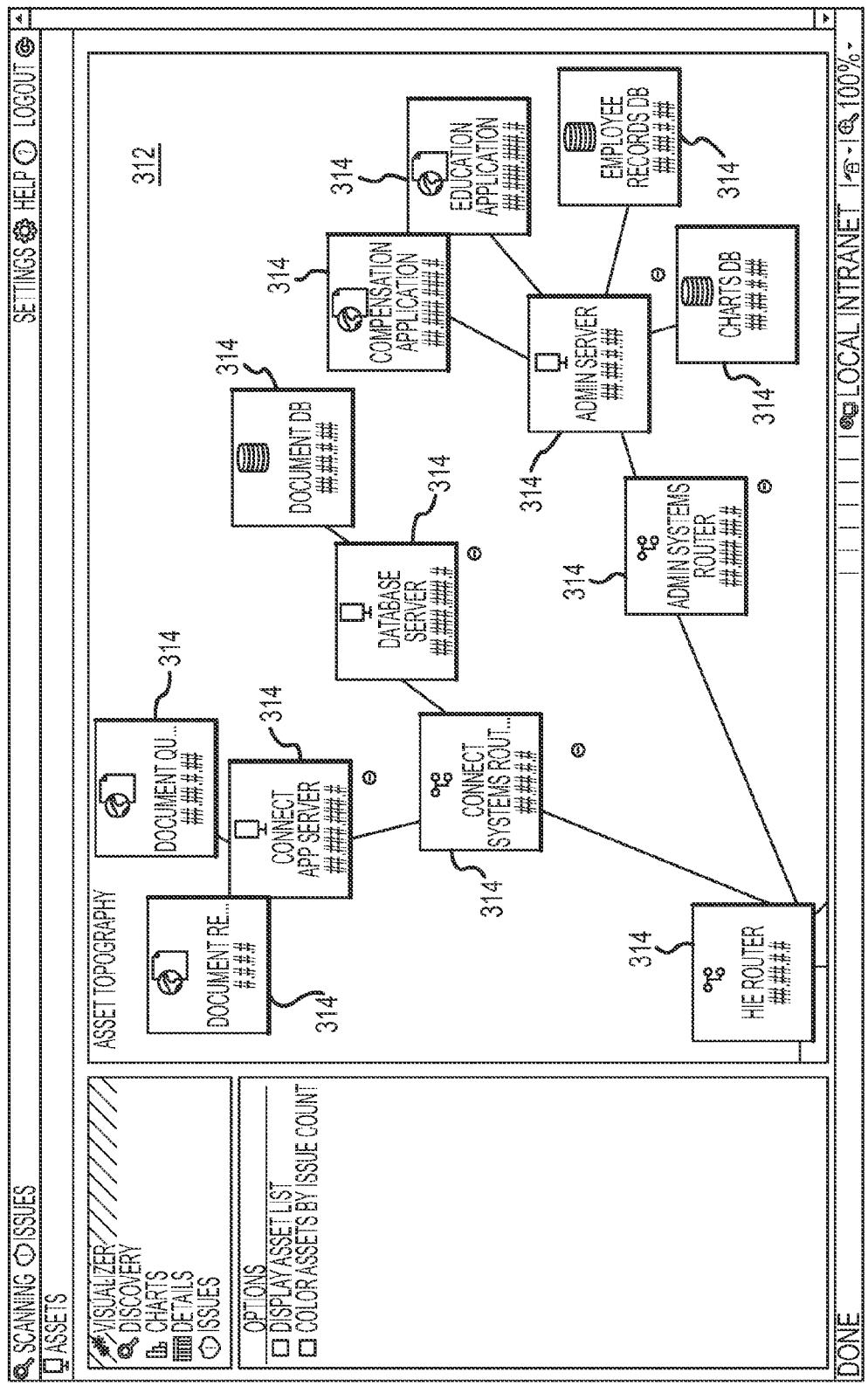
FIGS. 3D-3E depict several visual outputs relating to an inventory portion of the computer implemented EVMP as may be displayed to a user on a display screen.
Figure 3E:
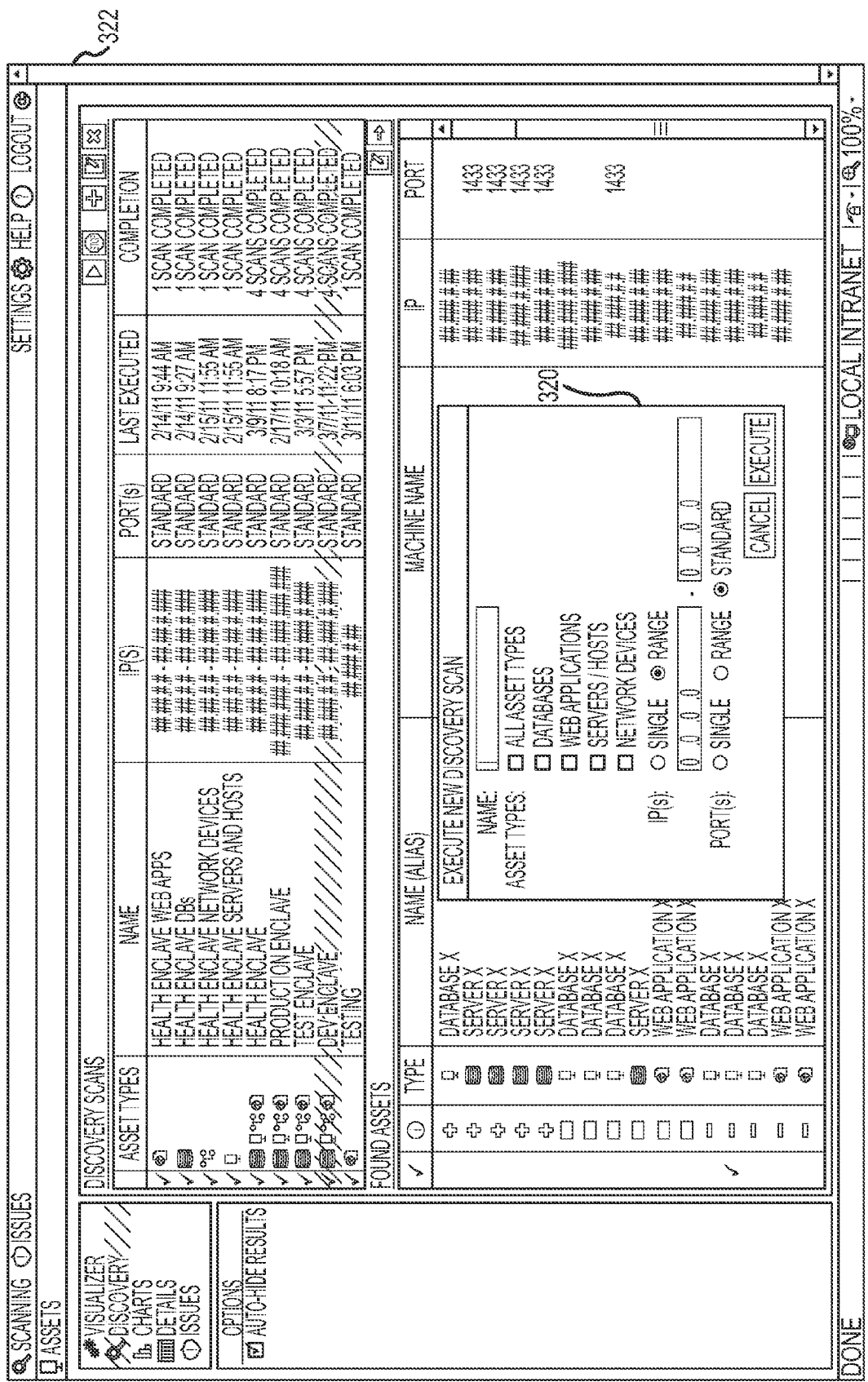
Figure 3F:
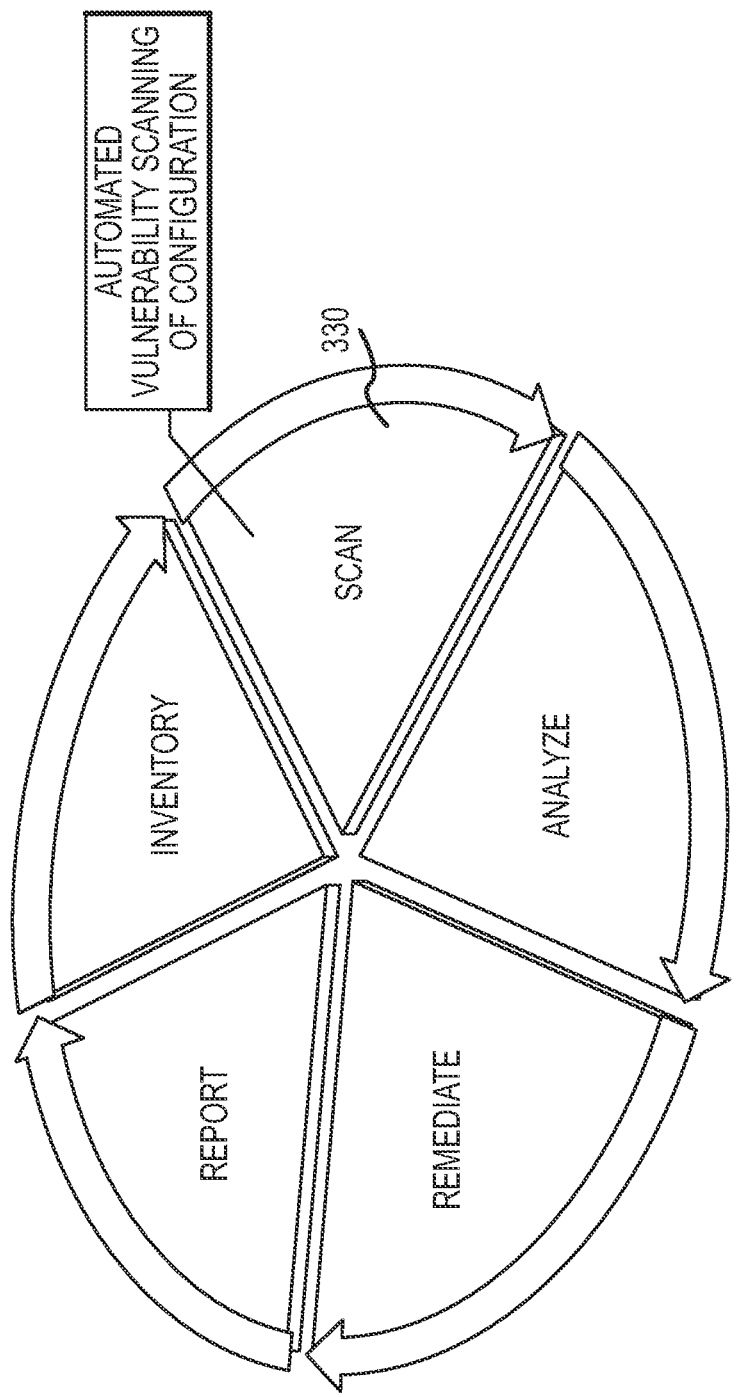
FIG. 3F provides an overview of the scanning portion of the EVMP.
Figure 3G:
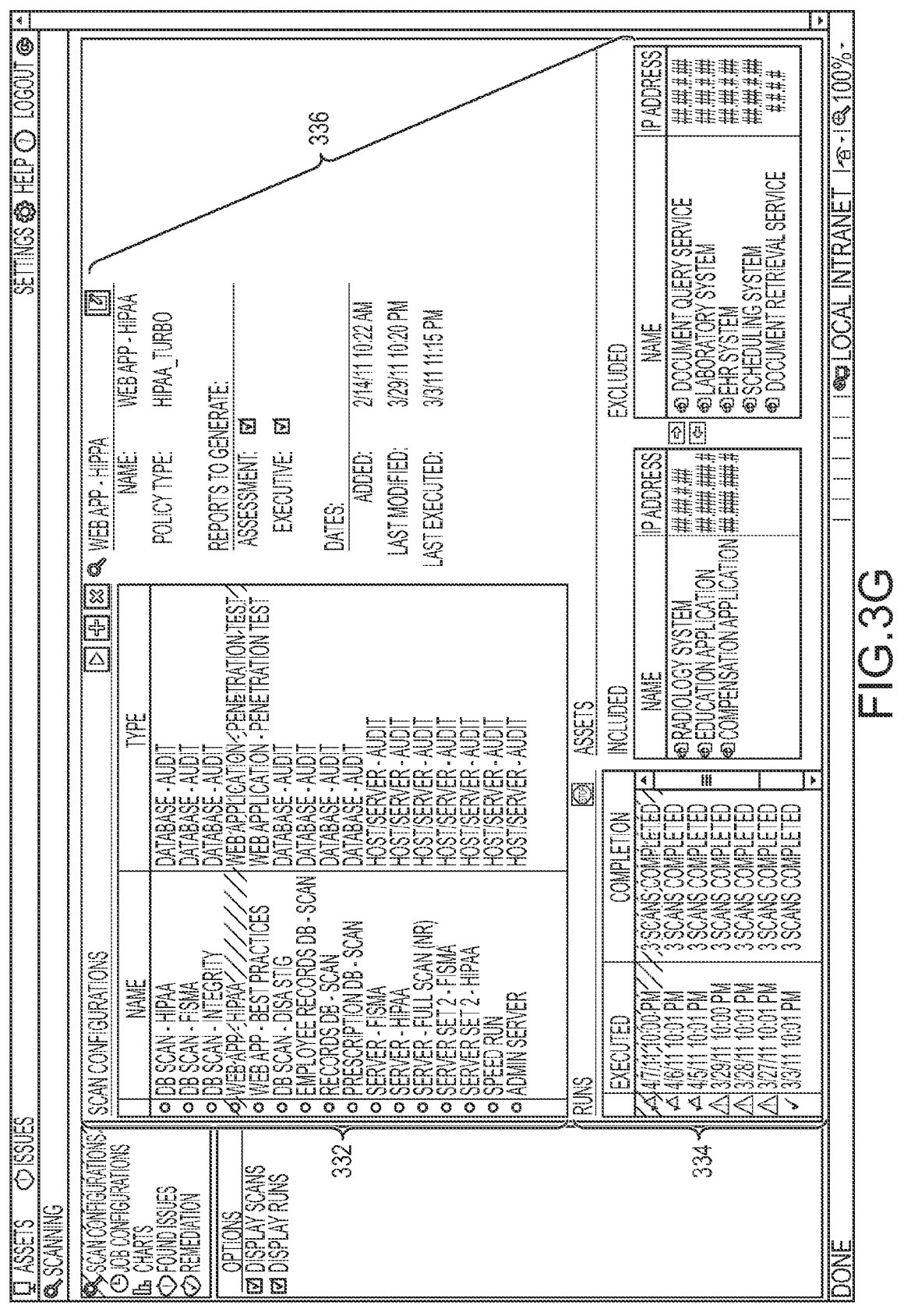
Figure 3H:
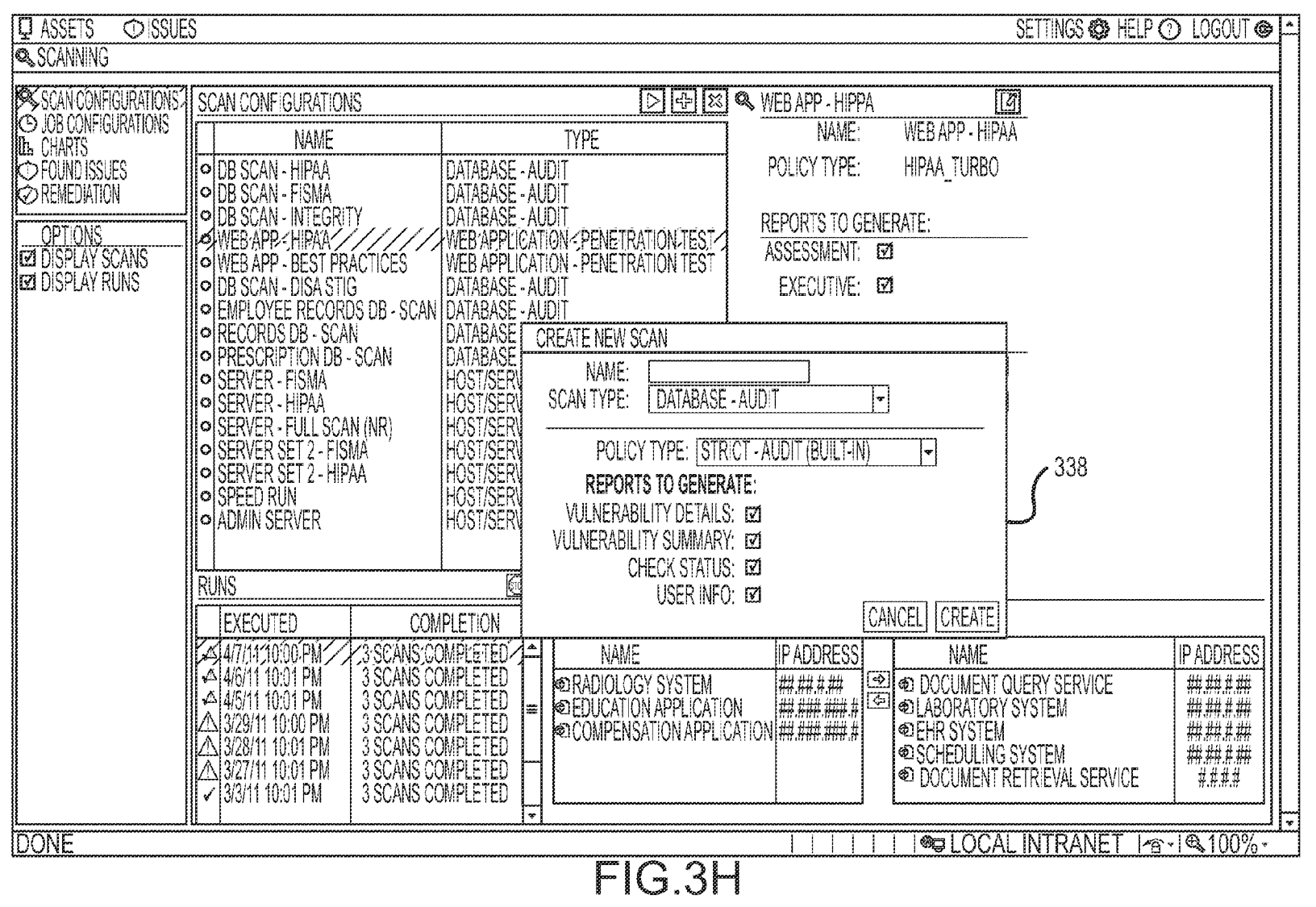
Figure 3I:
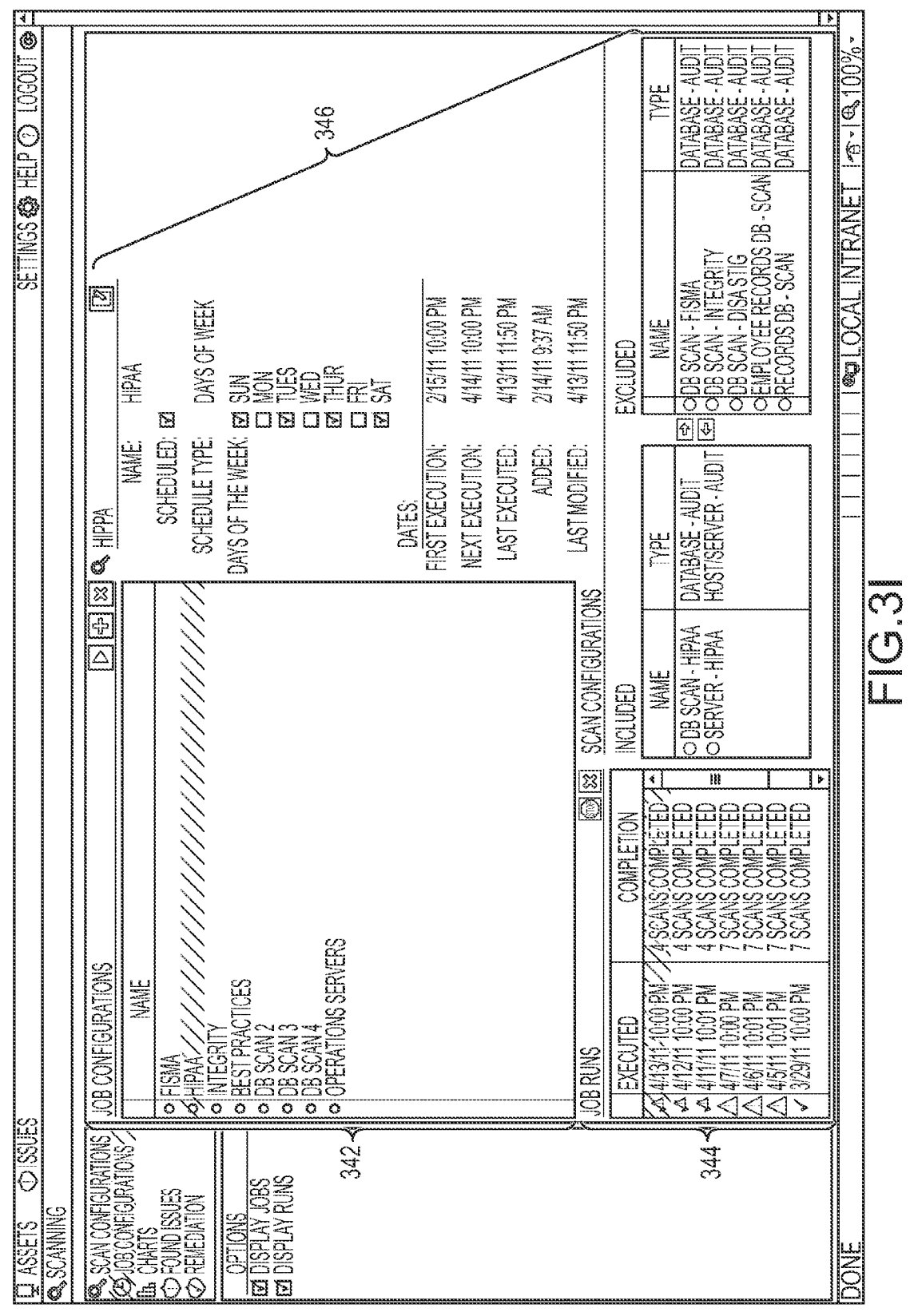
Figure 3J:
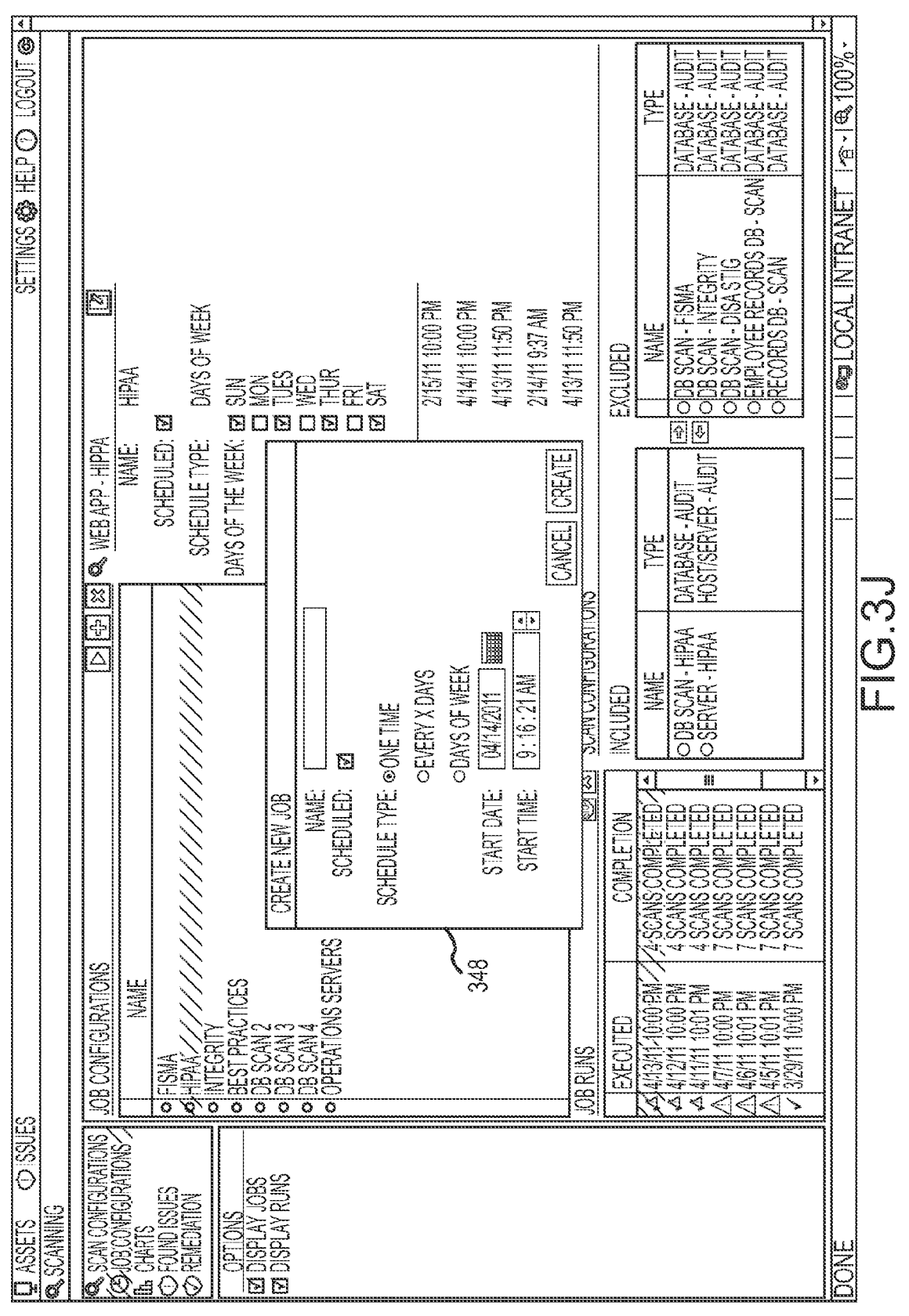
Figure 3K:
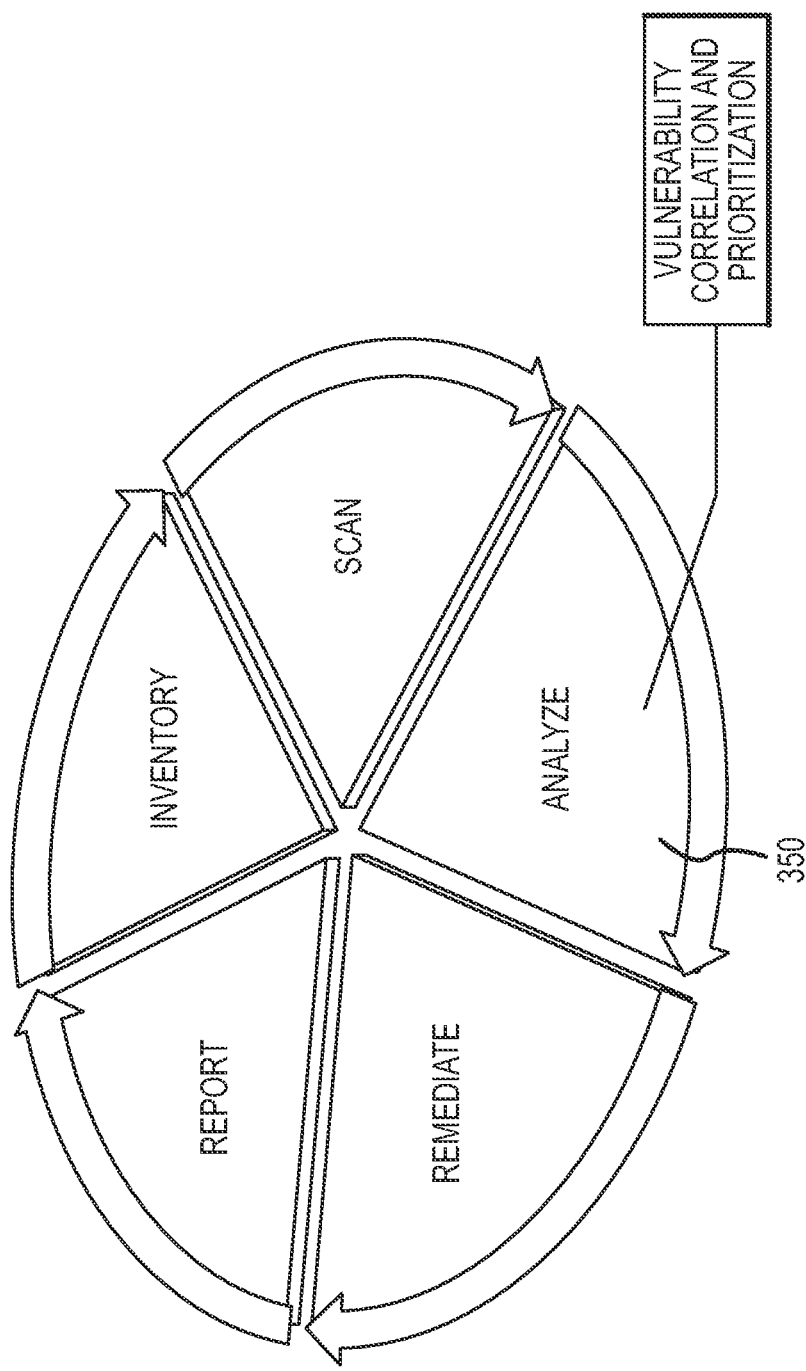
FIG. 3K provides an overview of the analysis portion of the EVMP.
Figure 3L:
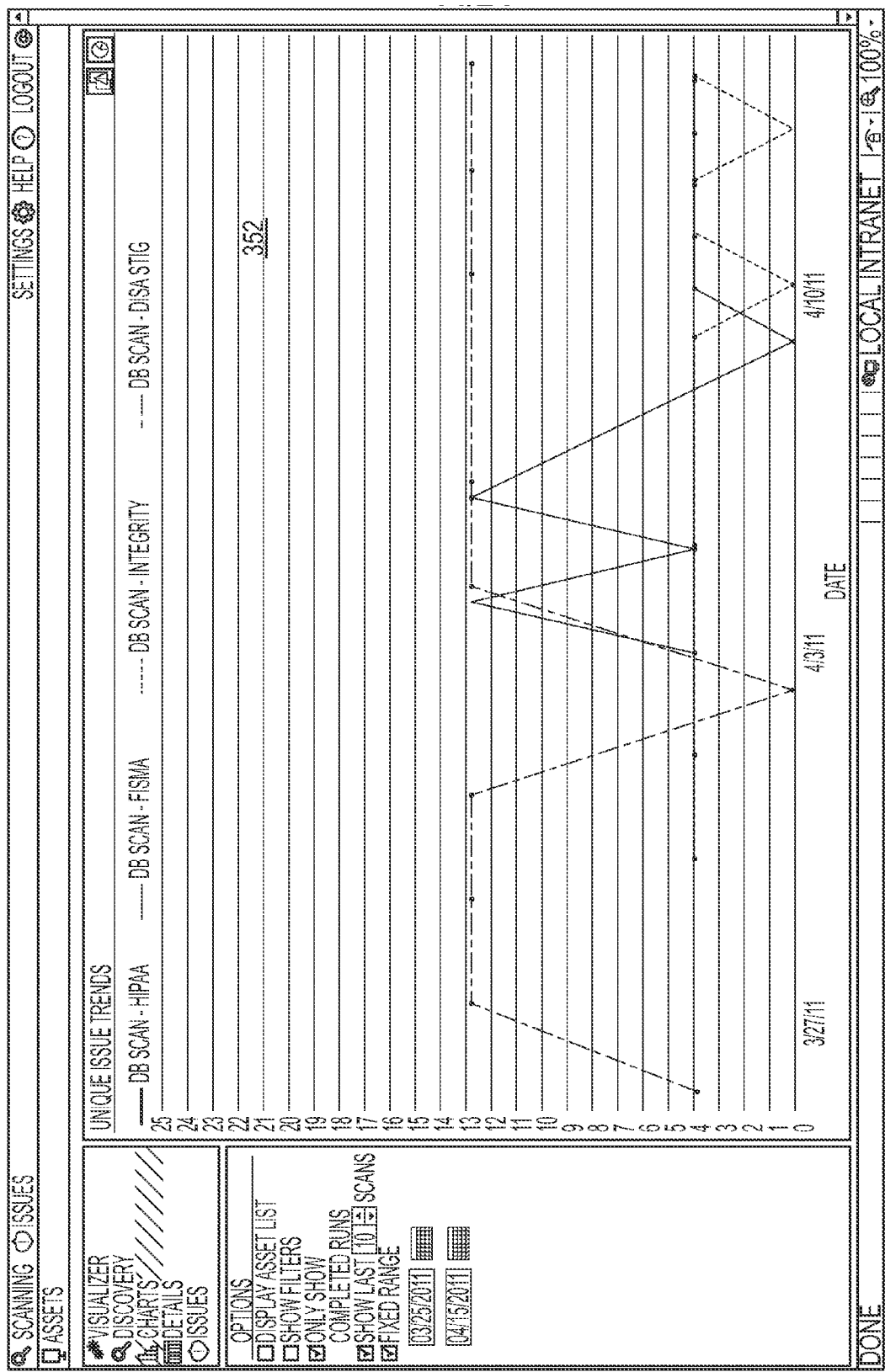
Figure 3M:
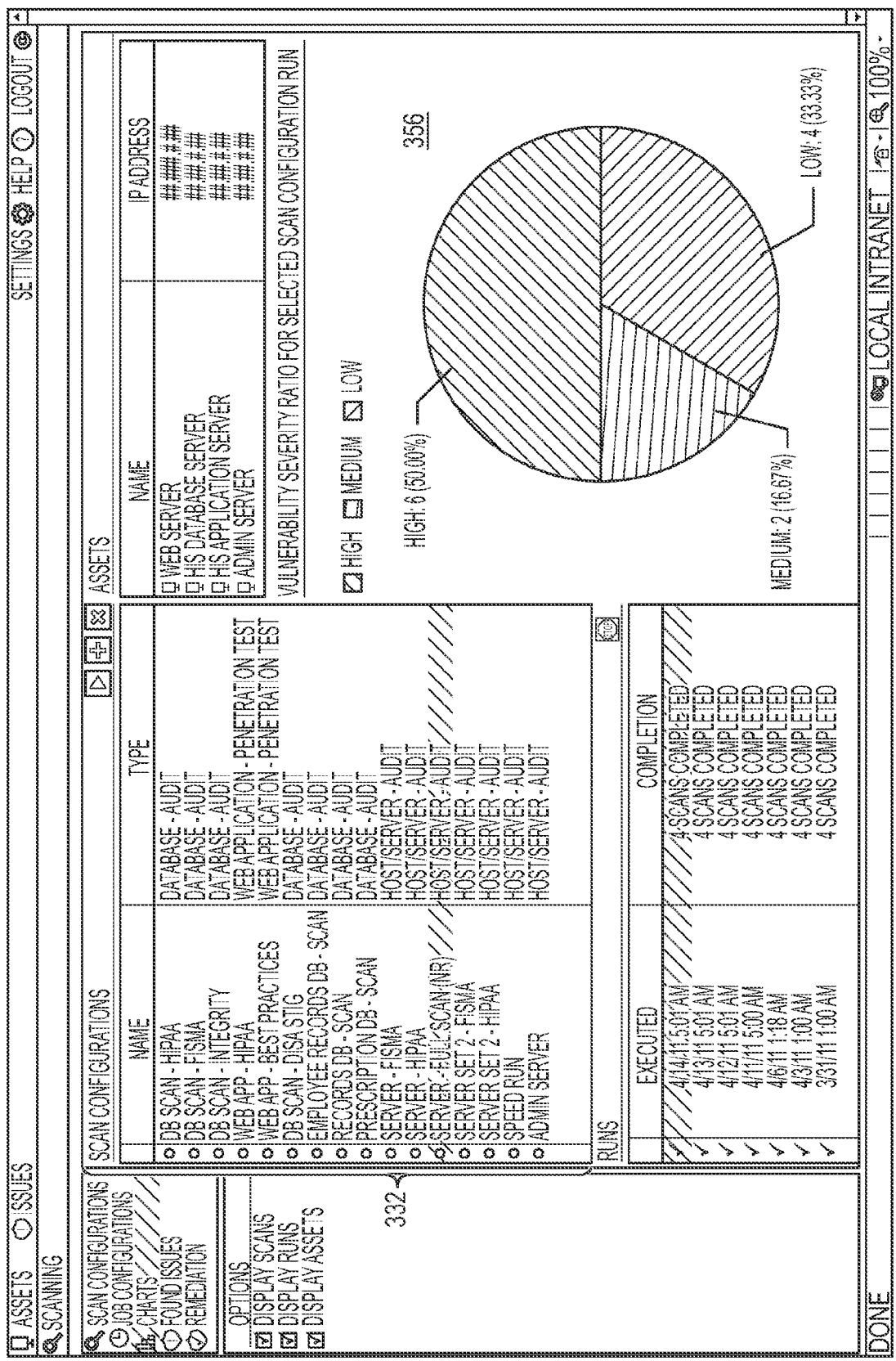
Figure 3N:
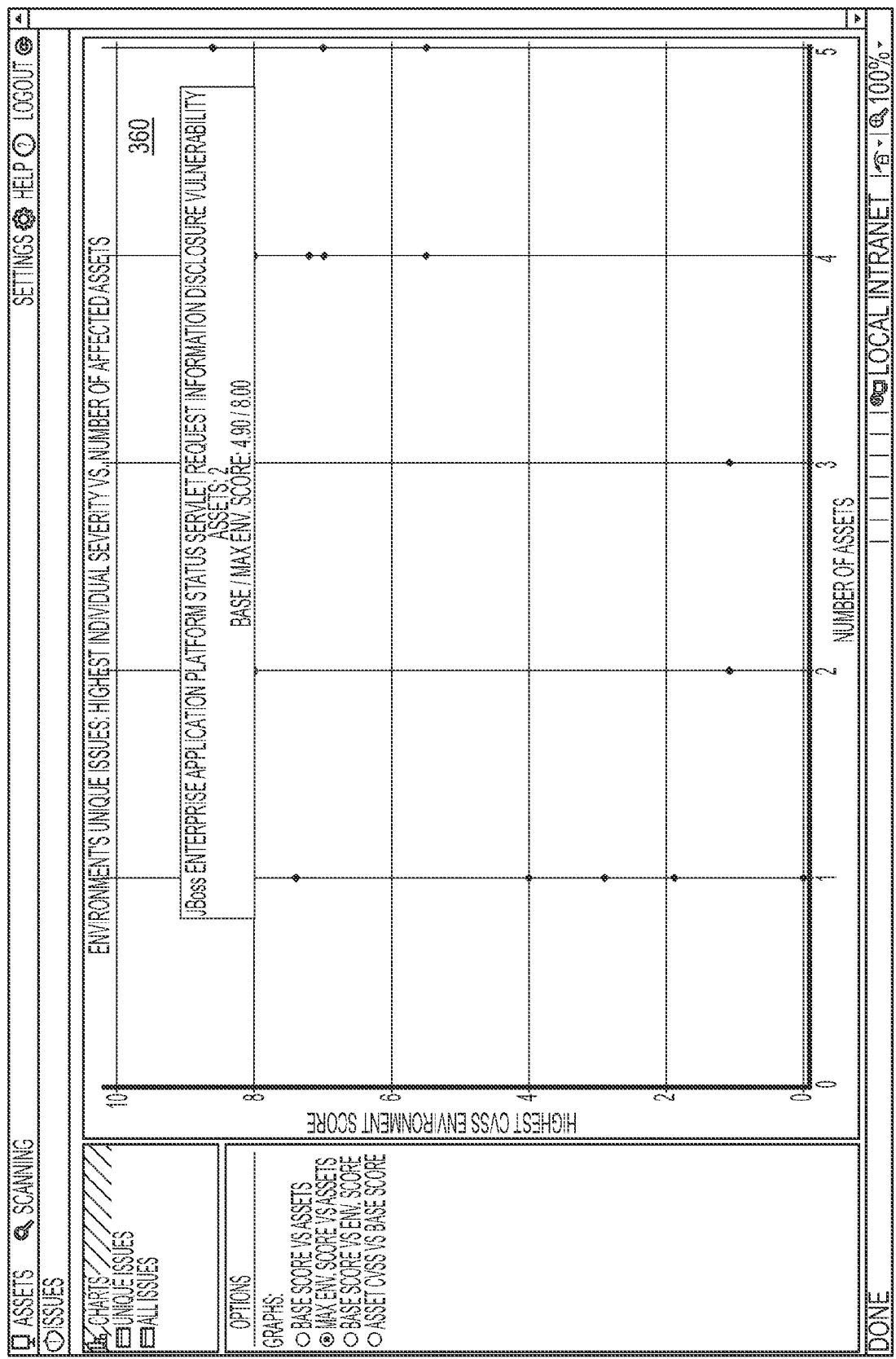
Figure 3P:
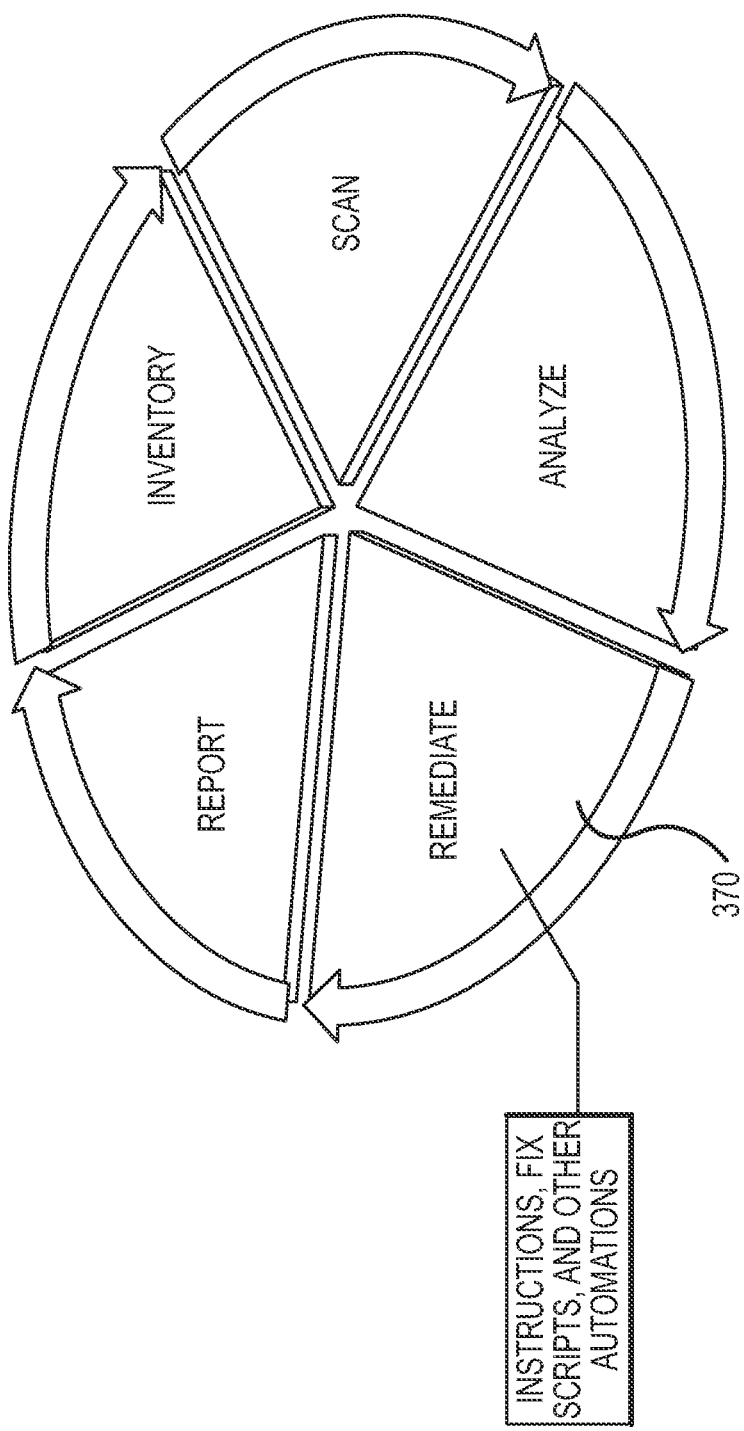
FIG. 3P provides an overview of the remediation portion of the EVMP.
Figure 3Q:
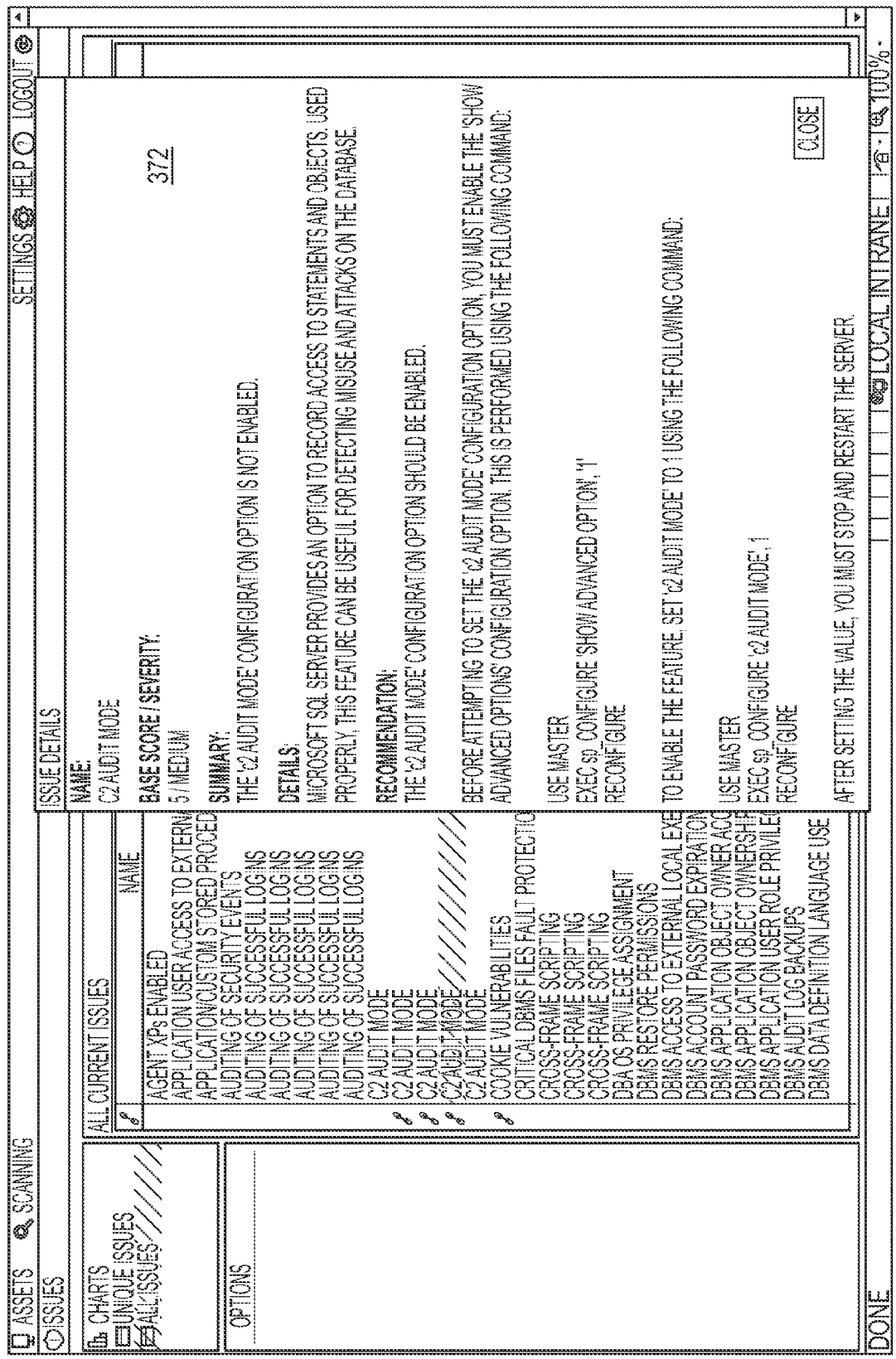
Figure 3S:
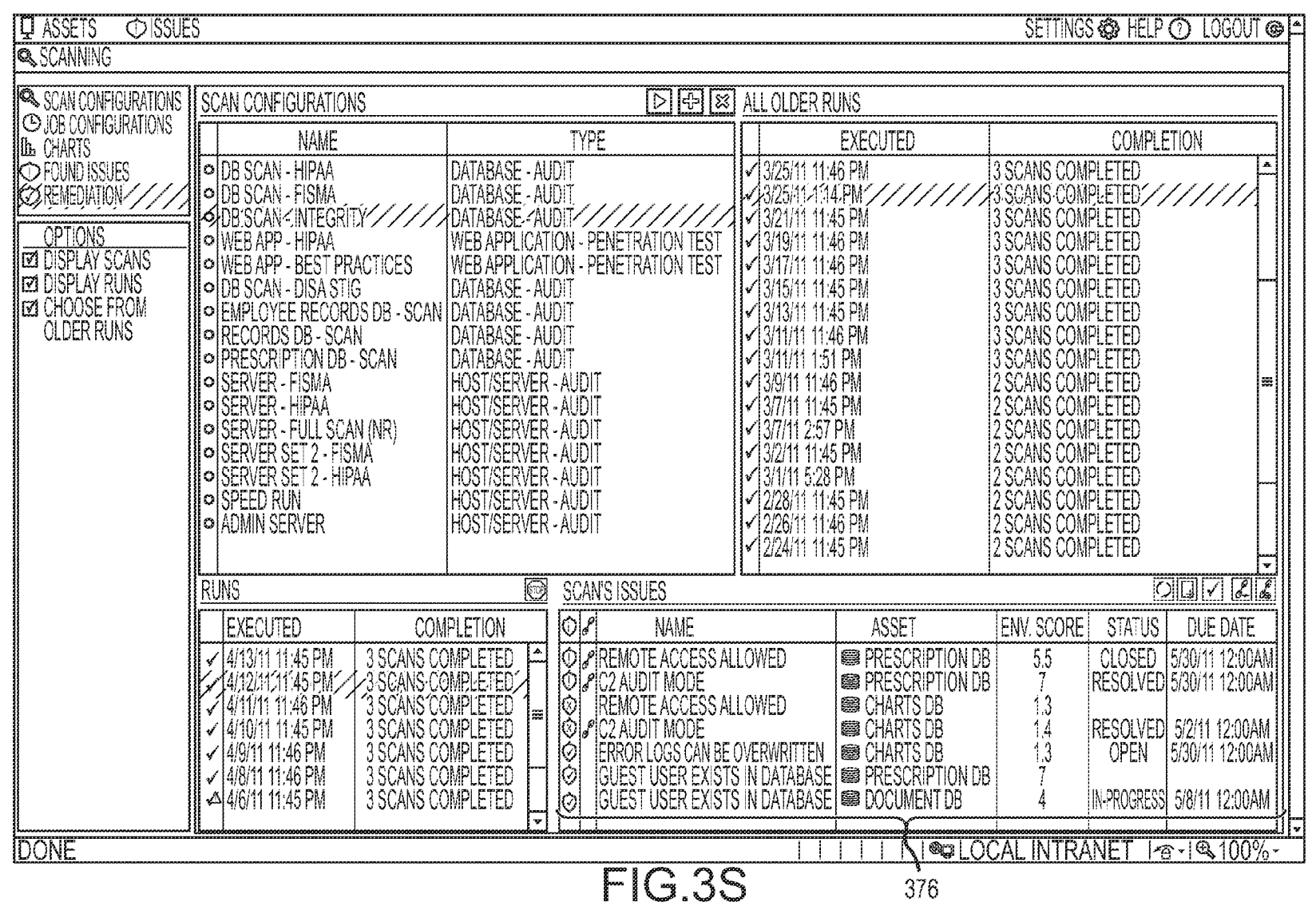
Figure 3T:
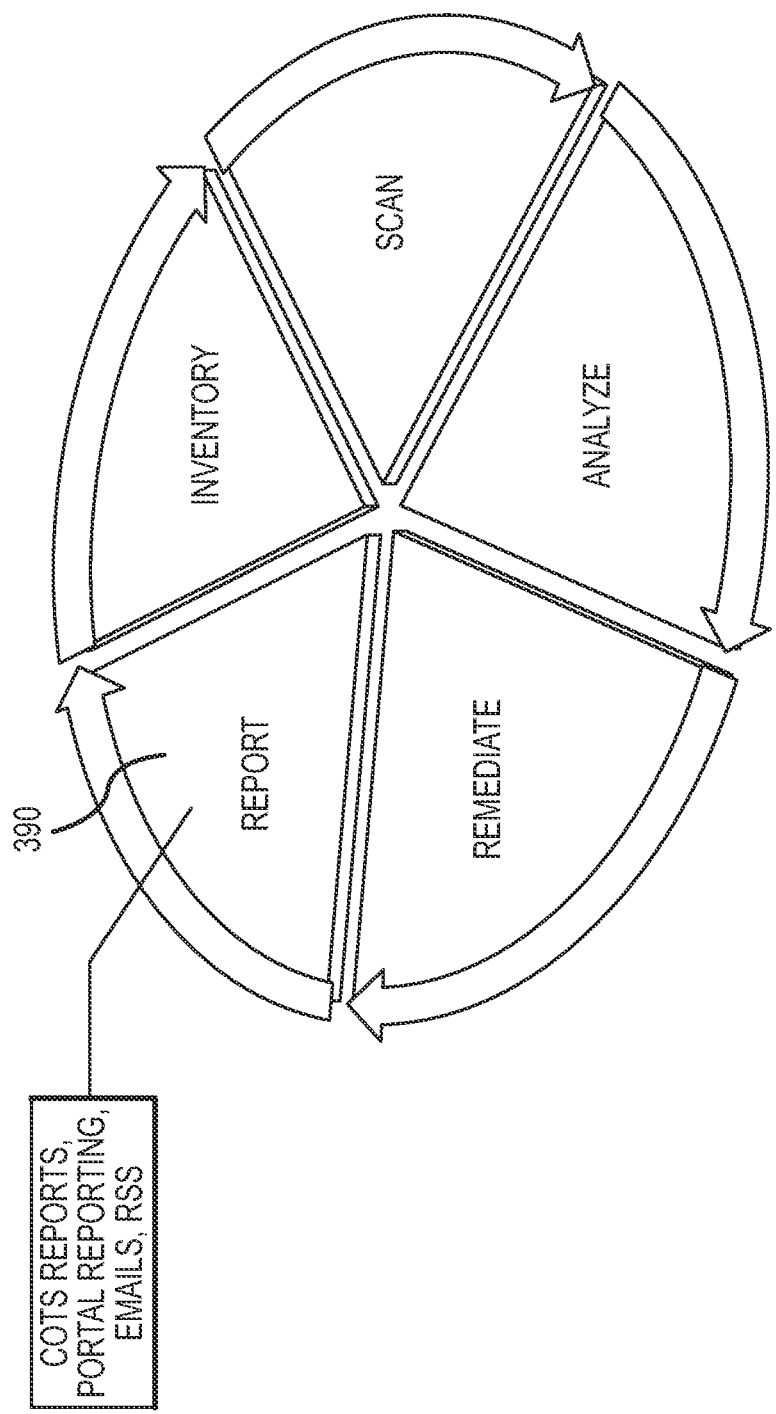
FIG. 3T provides an overview of the reporting portion of the EVMP.
Figure 3V:
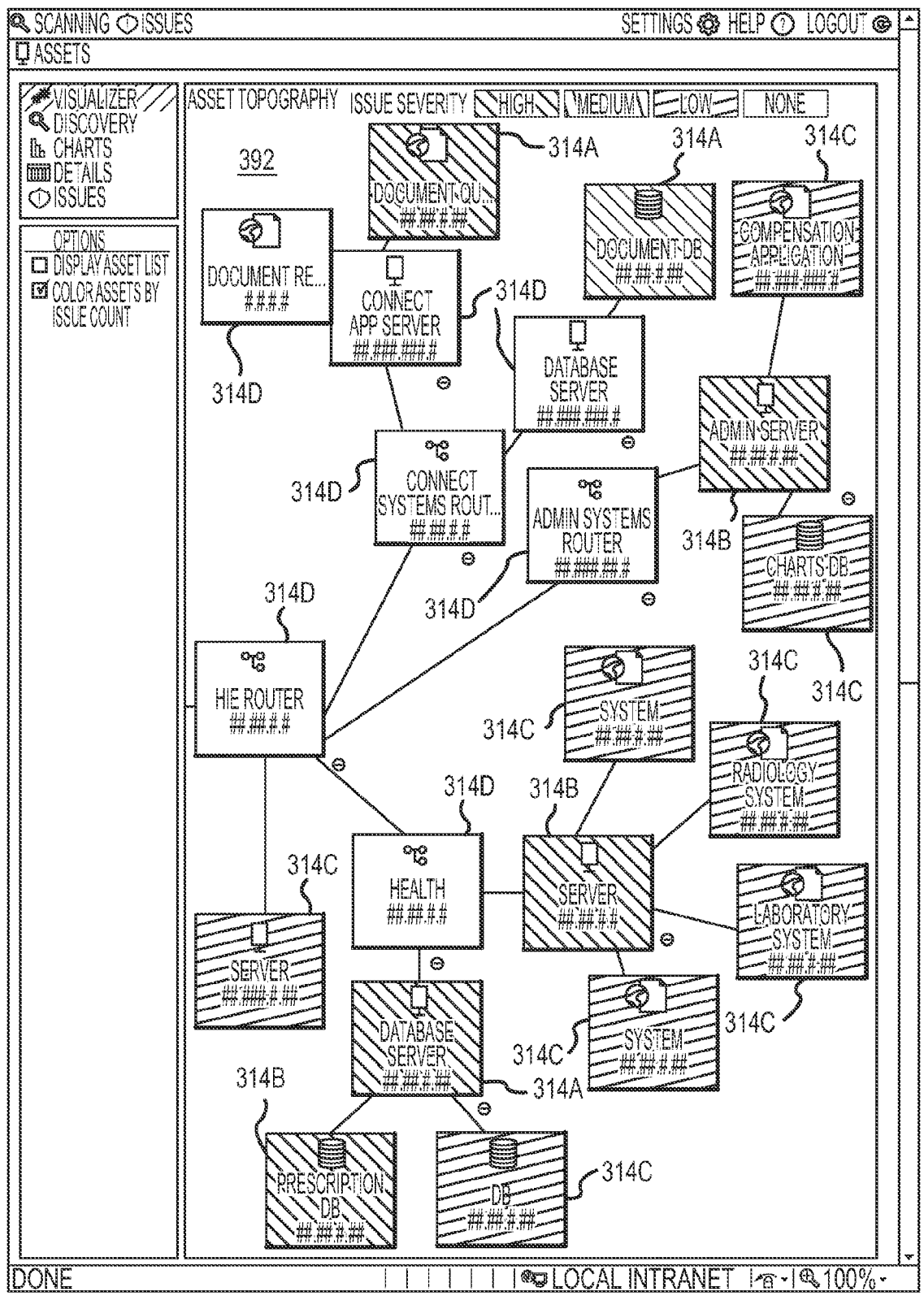

Referring to FIGS. 3A-3V, one embodiment of an enterprise vulnerability management process (EVMP) 300 may include inventory 310, scanning 330, analysis 350, remediation 370 and reporting 390 portions such as shown in FIG. 3A. The EVMP may be implemented in the form of computer software code executable by one or more computer hardware platforms. Various visual outputs during the EVMP may be generated and displayed to one or more users on one or more display screens in communication with the one or more computer hardware platforms. As shown by the arrows in FIG. 3A, the EVMP 300 may generally proceed from the inventory portion 310, to the scanning portion 330, to the analysis portion 350, to the remediation portion 370, and finally to the reporting portion 390. However, it is possible that one or more of the portions of the EVMP 300 may be skipped (e.g. the reporting portion 390 might be skipped if no reports are desired by the user).

Prior to commencing the EVMP 300, a user of the computer-implemented EVMP may first be presented with a login screen 300 such as shown in FIG. 3B. The login screen 304 may include a login input box 306 that prompts the user to enter a user identification and password in order to proceed with execution of the EVMP 300.

As depicted in FIG. 3C, after a user logs in, the EVMP 300 may proceed to the inventory portion 310 wherein discovery and accounting of current enterprise information technology assets is performed. Exemplary visual outputs that may be displayed to the user during the inventory portion 310 of the EVMP 300 are depicted in FIGS. 3D-3E.

One exemplary output that may be displayed to the user during the inventory portion 310 is an asset topography chart 312 such as shown in FIG. 3D. In the asset topography chart 312 connections between various information technology assets 314 of the enterprise are visually depicted. The asset topography chart 312 may be zoomed such as shown in FIG. 3D in order to show a portion of the asset topography chart 312 on a larger scale. Another exemplary output that may be displayed to the user during the inventory portion 310 is an input box 320 such as shown in FIG. 3E that prompts the user to enter and/or select various properties of a new discovery scan that is to be executed. Such properties may include a name for the scan, the asset types to be scanned, the Internet Protocol (IP) address(es) to be included in the scan, and the port(s) to be included in the scan. The execute new discovery scan input box 320 may be displayed in conjunction with a list of the assets 322 displayed to the user (e.g. overlaying the list of assets 322 as shown in FIG. 3E).

As depicted in FIG. 3F, the next portion of the EVMP 300 is the scanning portion 330 wherein automated vulnerability scanning of the inventoried assets is performed. Exemplary visual outputs that may be displayed to the user during the scanning portion 330 of the EVMP 300 are depicted in FIGS. 3G-3J.

One exemplary output that may be displayed to the user during the scanning portion 330 is a scan configurations list 332 such as shown in FIG. 3G. The scan configurations list 332 may allow the user to select a particular named scan (e.g. the highlighted 'Web App—HIPAA' scan) for which to display corresponding information 334 regarding when such scan was run and information about properties 336 of such scan (e.g., when it was added, when it was last modified, when it was last executed, and which assets are included and which are excluded from the scan). Another exemplary output that may be displayed to the user during the scanning portion 330 is an input box 338 such as shown in FIG. 3H that prompts the user to enter and/or select various properties of a new scan that is to be created. Such properties may include a name for the scan, a scan type, a policy type and indication(s) of what reports(s) to generate. Input box 338 may be displayed in conjunction with the scan configurations list 332 display (e.g. overlaying the scan configurations list 332 display such as shown in FIG. 3H).

A further exemplary output that may be displayed to the user during the scanning portion 330 is a job configurations list 342 such as shown in FIG. 3G. The job configurations list 342 may allow the user to select a particular named job (e.g.

the highlighted 'HIPAA' job) for which to display corresponding information 344 regarding when such job was run and information about properties 346 of such job (e.g., when it is scheduled to be run, when it was first executed, when it is to be executed next, when it was last executed, when it was added, when it was last modified, and which scan configurations are included and which are excluded from the job). One more exemplary output that may be displayed to the user during the scanning portion 330 is an input box 348 that prompts the user to enter and/or select various properties of a new job that is to be created such as shown in FIG. 3J. Such properties may include a name for the job, whether the job is scheduled to be run, and if so when it is to be run. Input box 348 may be displayed in conjunction with the job configurations list 342 display (e.g. overlaying the job configurations list 342 display such as shown in FIG. 3J).

As depicted in FIG. 3K, the next portion of the EVMP 300 is the analysis portion 350 wherein vulnerability correlation and prioritization are performed. Exemplary visual outputs that may be displayed to the user during the analysis portion 350 of the EVMP 300 are depicted in FIGS. 3L-3O.

One exemplary output that may be displayed to the user during the analysis portion 350 is a chart 352 such as shown in FIG. 3L showing the number of unique issues identified during one or more scans verses the date(s) such scan(s) were executed. The number of unique issues versus date chart 352 allows the user to easily visualize trends in the scan(s) over a period of time. The user may select different properties of the chart 352 such as, for example, how many scans to include and the range of date(s) to include in the chart 352.

Another exemplary output that may be displayed to the user during the analysis portion 350 is a chart 356 such as shown in FIG. 3M showing the ratio(s) of different severities of vulnerabilities (e.g. low, medium and high) identified during a selected scan. In this regard, the vulnerability severity ratio chart 356 may, for example, be displayed in conjunction with the scan configurations list 332 wherein the user has selected a particular named scan configuration (e.g. the highlighted 'Server—Full Scan (NR)' scan configuration) for which to display chart 356.

A further exemplary output that may be displayed to the user during the analysis portion 350 is a chart 360 such as depicted in FIG. 3N showing the selected analysis scores versus the number of affected assets or other analysis scores. In this regard, the user may, for example, select the base score versus number of assets, the maximum environment score versus number of assets, the base score versus the environment score, or the asset CVSS versus the base score to be displayed in the chart 360.

One more exemplary output that may be displayed to the user during the analysis portion 350 is an identified issues list 364 such as shown in FIG. 3O. In this regard, the user may, for example, be able to select whether to include all issues identified in a particular scan or only current unique issues in the identified issue list 364.

As depicted in FIG. 3P, the next portion of the EVMP 300 is the remediation portion 370 wherein instructions, fix scripts and other automations are provided and/or performed. Exemplary visual outputs that may be displayed to the user during the remediation portion 370 of the EVMP 300 are depicted in FIGS. 3Q-3S.

One exemplary output that may be displayed to the user during the remediation portion 370 is details 372 such as shown in FIGS. 3Q-3R regarding a particular identified issue. In this regard, the issue for which to display details 372 may be selected by the user from the identified issues list 364 (e.g., from the all current issues list 364 such as shown in FIG. 3Q or from the current unique issues list 364 such as shown in FIG. 3R) and displayed in conjunction with (e.g. overlaying or adjacent to) the identified issues list 364. Information included in the details 372 may, for example, include a name of the issue, the base score/severity of the issue, a summary of the issue, additional information on the issue, and recommendations for remediating the issue.

Another exemplary output that may be displayed to the user during the remediation portion 370 is information 376 such as shown in FIG. 3S regarding the remediated status of issues identified during the scan. In this regard, the information 376 may, for example, include the name of the issue, the asset it affects, a severity score (e.g. environment score) associated with the issue, a status of the issue, and a due date for addressing the issue. The remediation status of an issue included in the information 376 may, for example, indicate whether the issue is closed, resolved, open, or in progress.

As depicted in FIG. 3T, the next portion of the EVMP 300 is the reporting portion 390 wherein COTS and internal reports, portal reports, emails and RSS feeds are delivered and/or provided. Exemplary visual outputs that may be displayed to the user during the reporting portion 390 of the EVMP 300 are depicted in FIGS. 3U-3V.

One more exemplary output that may be displayed to the user during the reporting portion 390 is an issues list 392 such as shown in FIG. 3U. In this regard, the issue list 392 displayed during the reporting portion 390 may, for example, include a name of each issue, the asset affected by the issue, and one or more vulnerability analysis scores (e.g., the environment score) associated with the issue. As part of the issue list 392 display, the user may be able to select all issues or only current issues.

Another exemplary output that may be displayed to the user during the reporting portion 390 is an asset topography chart 392 such as shown in FIG. 3V. In addition to depicting connections between various information technology assets of the enterprise and being zoomable to display a portion of the chart 392 at an enlarged scale, the asset topography chart 292 displayed to the user during the reporting portion 390 includes information identifying the severity (e.g. none, low, medium, high) of issue(s) affecting each asset. For example, the representation of assets 314A affected by issue(s) with a high degree of severity may be highlighted with a first color (e.g. red), the representation of assets 314B affected by issue(s) with a medium degree of severity may be highlighted with a second color (e.g. orange), the representation of assets 314C affected by issue(s) with a low degree of severity may be highlighted with a third color (e.g. yellow), and the representation of assets 314D that are not affected by any issue(s) may be highlighted by in a fourth color (e.g. gray) or not at all.

Deviations may be made from the specific embodiments disclosed in the specification without departing from the spirit and scope of the invention. For example, at least some of the functionalities performed by many of the processes and modules discussed herein may be performed by other modules, devices, processes, etc. The illustrations and discussion herein has only been provided to assist the reader in understanding the various aspects of the present disclosure.

Furthermore, the various engines, managers, modules, and the like disclosed herein may be in the form of any appropriate combination of hardware, software, middleware, firmware and/or the like operable to carry out the various functionalities disclosed herein. For instance, such software, middleware and/or firmware may be implemented as one or more computer program products, i.e., one or more modules of computer program instructions encoded on a computer-readable medium for execution by one or more processors or processing modules, or to control the operation of, one or more data processing apparatuses. For example, the engines and tools in the EVMA 200 and EVMP 300 may be provided in such computer-readable medium and executed by a processor or the like. The computer-readable medium can be a machine-readable storage device (e.g., a memory module), a machine-readable storage substrate, a memory device, a composition of matter affecting a machine-readable propagated signal, or a combination of one or more of them. In addition to hardware, the EVMA system 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide the various online, open source information collection and analysis functionalities disclosed herein) may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols, logic flows and the like described in this specification can be performed by one or more programmable processors executing one or more computer programs to perform functions by operating on input data and generating output. The processes, protocols, logic flows and the like can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In some embodiments, the EVMA system 100 may include one or more of various types of devices, including, but not limited to a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for generating a vulnerability score associated with en-information technology assets of an enterprise, said method comprising:

collecting results of at least one vulnerability assessment conducted on the information technology assets by at least one vendor tool;

analyzing each result for base score metrics, wherein steps of said analyzing each result for base score metrics comprising:

retrieving National Vulnerability Database (NVD) information;

when Common Vulnerabilities and Exposures (CVE) is present, retrieving base score metrics from an NVD repository;

when Common Weakness Enumeration (CWE) is present and CWE is mapped to one or more CVEs, retrieving Common Vulnerability Scoring System (CVSS) base score metrics for associated one or more CVEs from the NVD repository;

when CWE is present and CWE is mapped to one or more CVEs and a plurality of CVEs are retrieved, using CVSS base score metrics to generate a pseudo-CVE from retrieved CVEs when CWE is present and CWE is not mapped to one or more CVEs, using CVSS base score metrics to generate a pseudo-CVE based on result details; and when CVE is not present and CWE is not present, using CVSS base score metrics to generate a pseudo-CVE based on result details;

analyzing each result for temporal score metrics;

analyzing each result for environment score metrics; and generating a CVSS score for each result based on the base score metrics, temporal score metrics and environment score metrics for each result, wherein one or more of said steps of collecting results of at least one vulnerability assessment, analyzing each result for base score metrics, analyzing each result for temporal score metrics, analyzing each result for environment score metrics, and generating a CVSS score for each result are performed on a computer hardware platform having a processing module executing computer program code stored on a memory module of the computer hardware platform.

2. The method of claim 1 wherein said step of analyzing each result for temporal score metrics comprises: retrieving a CVE;

when a temporal score is indicated as being available from a NVD repository, retrieving CVSS temporal score metrics from the NVD repository;

when an NVD temporal score is not available, analyzing CVE links to determine if temporal score metrics are available from an outside repository and, when the outside repository has temporal score metrics, retrieving CVSS temporal score metrics from the outside repository;

when an NVD temporal score is not available and temporal score metrics are not available from an outside source, determining whether a temporal score can be calculated and if so, using CVSS temporal score metrics to generate a pseudo-CVE based on details of the result; an when an NVD temporal score is not available and temporal score metrics are not available from an outside source and a temporal score cannot be calculated, using default temporal score metrics.

3. The method of claim 1 wherein said step of analyzing each result for environment score metrics comprises: retrieving an asset associated with the result; when a user provided environment score is indicated as being available, retrieving CVSS environment score metrics from an enterprise vulnerability management application (EVMA) repository, and when an asset evaluation algorithm (AVA) provided environment score is indicated as being available, retrieving CVSS environment score metrics from an EVMA\AVA repository and blending the environment score metrics retrieved from the EVMA repository and the AVA repository;

when a user provided environment score is not available and an AVA provided environment score is indicated as being available, retrieving CVSS environment score metrics from an EVMA\AVA repository; and when a user provided environment score is not available and an AVA provided environment score is not available, using default environment score metrics.

4. The method of claim 1 wherein, in said step of analyzing each result for base score metrics, the base metrics comprise one or more of an access vector metric, an access complexity metric, an authentication metric, a confidentiality impact metric, an integrity impact metric, and an availability impact metric.

5. The method of claim 1 wherein, in said analyzing each result for temporal score metrics, the temporal score metrics comprise one or more of an exploitability metric, a remediation level metric, and a report confidence metric.

* * * * *

UNITED STATES PATENT AND TRADEMARK OFFICE
CERTIFICATE OF CORRECTION

PATENT NO.      : 8,789,192 B2
APPLICATION NO. : 13/442636
DATED           : July 22, 2014
INVENTOR(S)     : LaBumbard It is certified that error appears in the above-identified patent and that said Letters Patent is hereby corrected as shown below:

In the Claims:

Column 16, line 66, claim 1, delete "en-information", and insert -- information --.

Column 18, line 11, claim 2, delete "; an", and insert -- ; and --.

Signed and Sealed this
Twenty-first Day of October, 2014

Michelle K. Lee
*Deputy Director of the United States Patent and Trademark Office*